United States Patent
Phoenix

(10) Patent No.: US 10,705,590 B2
(45) Date of Patent: Jul. 7, 2020

(54) POWER-CONSERVING CACHE MEMORY USAGE

(71) Applicant: Google LLC, Mountain View, CA (US)

(72) Inventor: Christopher J. Phoenix, Mountain View, CA (US)

(73) Assignee: Google LLC, Mountain View, CA (US)

( * ) Notice: Subject to any disclaimer, the term of this patent is extended or adjusted under 35 U.S.C. 154(b) by 184 days.

(21) Appl. No.: 15/824,744

(22) Filed: Nov. 28, 2017

(65) Prior Publication Data

US 2019/0163252 A1    May 30, 2019

(51) Int. Cl.
*G06F 1/3225* (2019.01)
*G06F 1/3234* (2019.01)
(Continued)

(52) U.S. Cl.
CPC .......... *G06F 1/3275* (2013.01); *G06F 1/3225* (2013.01); *G06F 12/0804* (2013.01);
(Continued)

(58) Field of Classification Search
CPC .............. G06F 1/3275; G06F 12/0888; G06F 12/0811; G06F 12/0835; G06F 12/0804;
(Continued)

(56) References Cited

U.S. PATENT DOCUMENTS 6,105,109 A * 8/2000 Krumm ............... G06F 12/0802 711/122
6,519,682 B2 * 2/2003 Richardson ......... G06F 12/0859 711/122

(Continued)

FOREIGN PATENT DOCUMENTS

CN    104106057    10/2014
TW    200745863    12/2007
(Continued)

OTHER PUBLICATIONS

Ko Watanabe et al., "Reducing Dynamic Energy of Variable Level Cache", International Journal of Computer and Electrical Engineering, vol. 5, No. 6, Dec. 2013, pp. 581-586, http://www.ijcee.org/papers/777-S0006.pdf (Year: 2013).*

(Continued)

*Primary Examiner* — Christopher D Birkhimer
(74) *Attorney, Agent, or Firm* — Colby Nipper PLLC

(57) ABSTRACT

Techniques and apparatuses are described that enable power-conserving cache memory usage. Main memory constructed using, e.g., DRAM can be placed in a low-power mode, such as a self-refresh mode, for longer time periods using the described techniques and apparatuses. A hierarchical memory system includes a supplemental cache memory operatively coupled between a higher-level cache memory and the main memory. The main memory can be placed in the self-refresh mode responsive to the supplemental cache memory being selectively activated. The supplemental cache memory can be implemented with a highly- or fully-associative cache memory that is smaller than the higher-level cache memory. Thus, the supplemental cache memory can handle those cache misses by the higher-level cache memory that arise because too many memory blocks are mapped to a single cache line. In this manner, a DRAM implementation of the main memory can be kept in the self-refresh mode for longer time periods.

20 Claims, 11 Drawing Sheets

(51) Int. Cl.
*G06F 12/0804* (2016.01)
*G06F 12/0811* (2016.01)
*G06F 12/0831* (2016.01)
*G06F 12/0888* (2016.01)

(52) U.S. Cl.
CPC ...... *G06F 12/0811* (2013.01); *G06F 12/0835* (2013.01); *G06F 12/0888* (2013.01); *G06F 2212/1028* (2013.01); *G06F 2212/502* (2013.01)

(58) Field of Classification Search
CPC ............. G06F 1/3225; G06F 2212/502; G06F 2212/1028
See application file for complete search history.

(56) References Cited

U.S. PATENT DOCUMENTS

| | | | | |
|---|---|---|---|---|
| 7,228,388 | B2* | 6/2007 | Hu | G06F 12/0888 711/122 |
| 7,865,669 | B2* | 1/2011 | Kornegay | G06F 12/0888 711/117 |
| 8,527,709 | B2 | 9/2013 | Jahagirdar et al. | |
| 8,656,106 | B2* | 2/2014 | Cox | G06F 12/0888 711/124 |
| 8,706,966 | B1* | 4/2014 | Kraipak | G06F 12/084 711/118 |
| 8,838,897 | B2* | 9/2014 | Hu | G06F 12/0846 711/118 |
| 9,047,223 | B2* | 6/2015 | Hu | G06F 12/0846 |
| 9,058,269 | B2* | 6/2015 | Krick | G06F 12/0811 |
| 9,110,810 | B2* | 8/2015 | Wang | G06F 12/0862 |
| 9,122,612 | B2* | 9/2015 | Dundas | G06F 12/0862 |
| 9,251,069 | B2* | 2/2016 | Eckert | G06F 12/0808 |
| 9,298,643 | B2* | 3/2016 | Tran | H03K 19/0016 |
| 9,323,673 | B2* | 4/2016 | Habermann | G06F 12/0811 |
| 9,336,155 | B2* | 5/2016 | Jia | G06F 12/122 |
| 9,342,461 | B2* | 5/2016 | Liang | G06F 12/0804 |
| 9,348,752 | B1* | 5/2016 | Parakh | G06F 11/1451 |
| 9,448,940 | B2* | 9/2016 | Shalf | G06F 12/0813 |
| 9,465,938 | B2* | 10/2016 | Jakobsson | G06F 21/563 |
| 9,600,442 | B2* | 3/2017 | Hughes | G06F 9/30036 |
| 9,665,486 | B2* | 5/2017 | Habermann | G06F 12/0811 |
| 9,690,664 | B2* | 6/2017 | Ide | G06F 3/06 |
| 2005/0071564 | A1 | 3/2005 | Luick | G06F 12/0806 711/121 |
| 2006/0112233 | A1* | 5/2006 | Hu | G06F 12/0888 711/138 |
| 2006/0271738 | A1* | 11/2006 | Tran | G06F 9/30043 711/122 |
| 2009/0037664 | A1* | 2/2009 | Kornegay | G06F 12/0888 711/138 |
| 2009/0132764 | A1* | 5/2009 | Moll | G06F 1/3203 711/118 |
| 2009/0327609 | A1 | 12/2009 | Fleming et al. | |
| 2011/0314227 | A1* | 12/2011 | Blake | G06F 12/084 711/130 |
| 2014/0143498 | A1* | 5/2014 | Olson | G06F 12/0802 711/132 |
| 2014/0156932 | A1* | 6/2014 | Dundas | G06F 12/0862 711/122 |
| 2014/0181414 | A1* | 6/2014 | Eckert | G06F 12/0808 711/135 |
| 2014/0215160 | A1 | 7/2014 | Kocberber et al. | |
| 2014/0244960 | A1* | 8/2014 | Ise | G06F 3/061 711/165 |
| 2014/0281243 | A1* | 9/2014 | Shalf | G06F 12/0813 711/122 |
| 2015/0269090 | A1* | 9/2015 | Tran | H03K 19/0016 711/122 |
| 2016/0085968 | A1* | 3/2016 | Jakobsson | G06F 21/563 726/23 |
| 2016/0170884 | A1* | 6/2016 | Eddy | G06F 12/0811 711/122 |
| 2016/0203085 | A1 | 7/2016 | Kranich et al. | |
| 2016/0217031 | A1* | 7/2016 | Arslan | G06F 11/1008 |
| 2016/0224467 | A1* | 8/2016 | Habermann | G06F 12/0811 |
| 2016/0259726 | A1* | 9/2016 | Ide | G06F 3/06 |
| 2016/0259728 | A1* | 9/2016 | Eddy | G06F 12/0811 |
| 2016/0283380 | A1* | 9/2016 | Vinod | G06F 12/0833 |
| 2016/0328301 | A1* | 11/2016 | Parakh | G06F 11/1446 |
| 2016/0371226 | A1* | 12/2016 | Shalf | G06F 12/0813 |
| 2017/0300420 | A1* | 10/2017 | Hughes | G06F 12/0897 |

FOREIGN PATENT DOCUMENTS

| | | |
|---|---|---|
| TW | 200915059 | 4/2009 |
| TW | 201015318 | 4/2010 |
| WO | 2007097791 | 8/2007 |
| WO | 2019108280 | 6/2019 |

OTHER PUBLICATIONS

John Franco, "What is Direct Memory Access (DMA) and Why Should We Know About it?", Nov. 25, 2016, pp. 1-23, https://web.archive.org/web/20161125225336/http://gauss.ececs.uc.edu/Courses/c4029/lectures/dma.pdf (Year: 2016).*

Technopedia, "Processor Register", Oct. 15, 2011, pp. 1-3, https://web.archive.org/web/20111015023335/https://www.techopedia.com/definition/27596/processor-register (Year: 2011).*

TechTarget, "register", Jun. 14, 2012, pp. 1-13, https://web.archive.org/web/20120614022451/https://whatis.techtarget.com/definition/register (Year: 2012).*

Webopedia, "register", Apr. 11, 2001, pp. 1-2, https://web.archive.org/web/20010411030917/https://www.webopedia.com/TERM/R/register.html (Year: 2001).*

"Foreign Office Action", Taiwanese Application No. 107119411, dated Mar. 8, 2019, 9 pages.

"International Search Report and Written Opinion", PCT Application No. PCT/US2018/047120, dated Dec. 12, 2018, 13 pages.

Watanabe, et al., "Reducing Dynamic Energy of Variable Level Cache", International Journal of Computer and Electrical Engineering, vol. 5, No. 6, Dec. 2013, Dec. 2013, 6 pages.

* cited by examiner

POWER-CONSERVING CACHE MEMORY USAGE

BACKGROUND

Noon Electronic devices play integral roles in manufacturing, communication, healthcare, commerce, social interaction, and entertainment. For example, electronic devices power the server farms that provide cloud-based, distributed computing functionality for commerce and communication. Devices with computing power are also embedded in many different types of modern equipment, from medical devices to appliances and from vehicles to industrial tools. Additionally, one electronic device—the smartphone—has become a necessity to always have at hand With electronic devices becoming so pervasive, the power consumed by electronic devices has become an issue.

Manufacturers therefore consider anticipated levels of power consumption when designing electronic devices. Motivations for lowering power consumption include reducing cost-of-use and minimizing environmental impact. Furthermore, portable electronic devices are powered by batteries, which have a limited ability to provide energy before needing to be recharged. Thus, a portable electronic device can be used for longer periods before needing to be recharged by reducing power consumption. A lower rate of power consumption can also enable the use of a smaller battery to decrease the size of a portable electronic device.

In electronic devices, integrated circuits and printed circuit substrates, such as printed circuit boards (PCBs) or films, incur a significant percentage of the power consumption. By reducing the energy used by circuits over time, the power consumption of the overall electronic device can be reduced, and battery life can be lengthened. One approach to reducing the energy usage of circuits is to intermittently power down the circuits. Unfortunately, powering down circuits affects their functionality and may therefore impact the capabilities of, or user experience provided by, the corresponding electronic device.

Consider, for example, dynamic random-access memory (DRAM). DRAM is used in many electronic devices to store information, such as computer code and data, because of DRAM's unique combination of size, speed, and cost. A negative attribute of DRAM, however, is that DRAM consumes an appreciable amount of power while being used to store such information. Powering down a DRAM block can therefore save a significant quantity of power and extend battery life. Unfortunately, completely cutting power to DRAM causes the stored information to be lost. Accordingly, to reduce energy usage and extend battery life, designers search for techniques that can enable DRAM to be powered down without losing stored information.

This background description is provided to generally present the context of the disclosure. Unless otherwise indicated herein, material described in this section is neither expressly nor impliedly admitted to be prior art to the present disclosure or the appended claims.

SUMMARY

Techniques and apparatuses are described that enable power-conserving cache memory usage. These techniques and apparatuses enable main memory that is constructed using dynamic random-access memory (DRAM) to be placed in a low-power mode, such as a self-refresh mode, for longer periods of time or with fewer interruptions that cause the DRAM to be powered back up. To do so, a hierarchical memory system includes a supplemental cache memory operatively coupled between a higher-level cache memory and the main memory. The supplemental cache memory can be selectively activated, and the main memory can be placed in the self-refresh mode if the supplemental cache memory is active. The supplemental cache memory can be implemented with a highly or fully-associative cache memory that is smaller than the higher-level cache memory. Thus, the supplemental cache memory can handle those cache misses by the higher-level cache memory that arise because too many memory blocks are mapped to a single cache line, even when the higher-level cache memory is not full. In this manner, the DRAM of the main memory can be kept in the self-refresh mode for longer periods of time.

Aspects described below include an electronic device comprising a first cache memory at a first hierarchical level, a supplemental cache memory at a second hierarchical level, a main memory at a third hierarchical level, and control circuitry. The second hierarchical level is lower than the first hierarchical level, and the third hierarchical level is lower than the second hierarchical level. The supplemental cache memory is communicatively coupled to the first cache memory and configured to attempt to handle cache misses of the first cache memory. The main memory is communicatively coupled to both the first cache memory and the supplemental cache memory. The control circuitry is coupled to the supplemental cache memory and the main memory and is configured to cause a transition between two or more functional memory states. The two or more functional memory states include a first functional memory state and a second functional memory state. With the first functional memory state, the supplemental cache memory is in an inactive operational mode and the main memory is in a regular power mode. With the second functional memory state, the supplemental cache memory is in an active operational mode and the main memory is in a low-power mode.

Aspects described below also include a method comprising operating a memory system that includes a first cache memory, a supplemental cache memory, and a main memory, with the supplemental cache memory configured to selectively handle cache misses of the first cache memory. The method also comprises determining an operational mode of the supplemental cache memory, with the operational mode comprising an inactive operational mode or an active operational mode. The method additionally comprises, responsive to the supplemental cache memory being in the inactive operational mode, bypassing the supplemental cache memory for a memory request associated with a cache miss of the first cache memory and routing the memory request to the main memory. The method further comprises, responsive to the supplemental cache memory being in the active operational mode: determining that information targeted by the memory request is stored in the supplemental cache memory, and, responsive to determining that the targeted information is stored in the supplemental cache memory, providing the targeted information from the supplemental cache memory.

Aspects described below include another electronic device comprising one or more processors and one or more computer-readable storage media. The one or more computer-readable storage media include a first cache memory, a main memory, a supplemental cache memory communicatively coupled between the first cache memory and the main memory, and a register configured to hold a settable value. The one or more computer-readable storage media also include instructions stored thereon. Responsive to execution of the instructions by the one or more processors, the instructions cause multiple operations to be performed. These multiple operations include causing code to execute on the one or more processors and adjusting the settable value based on the code to selectively enable the supplemental cache memory to operate as a lower-level cache resource with respect to the first cache memory.

Aspects described below also include a system comprising a first cache memory at a first hierarchical level, a supplemental cache memory at a second hierarchical level, and a main memory at a third hierarchical level. The second hierarchical level is lower than the first hierarchical level, and the third hierarchical level is lower than the second hierarchical level. The system also comprises control means for causing a transition between two or more functional memory states, including a first functional memory state and a second functional memory state. To instantiate the first functional memory state, the control means causes the supplemental cache memory to transition to an inactive operational mode and the main memory to operate in a regular power mode. To instantiate the second functional memory state, the control means causes the supplemental cache memory to transition to an active operational mode and the main memory to operate in a low-power mode.

BRIEF DESCRIPTION OF THE DRAWINGS

Apparatuses of and techniques enabling power-conserving cache memory usage are described with reference to the following drawings. The same numbers are used throughout the drawings to reference like features and components.

DETAILED DESCRIPTION

Overview

Figure 1:
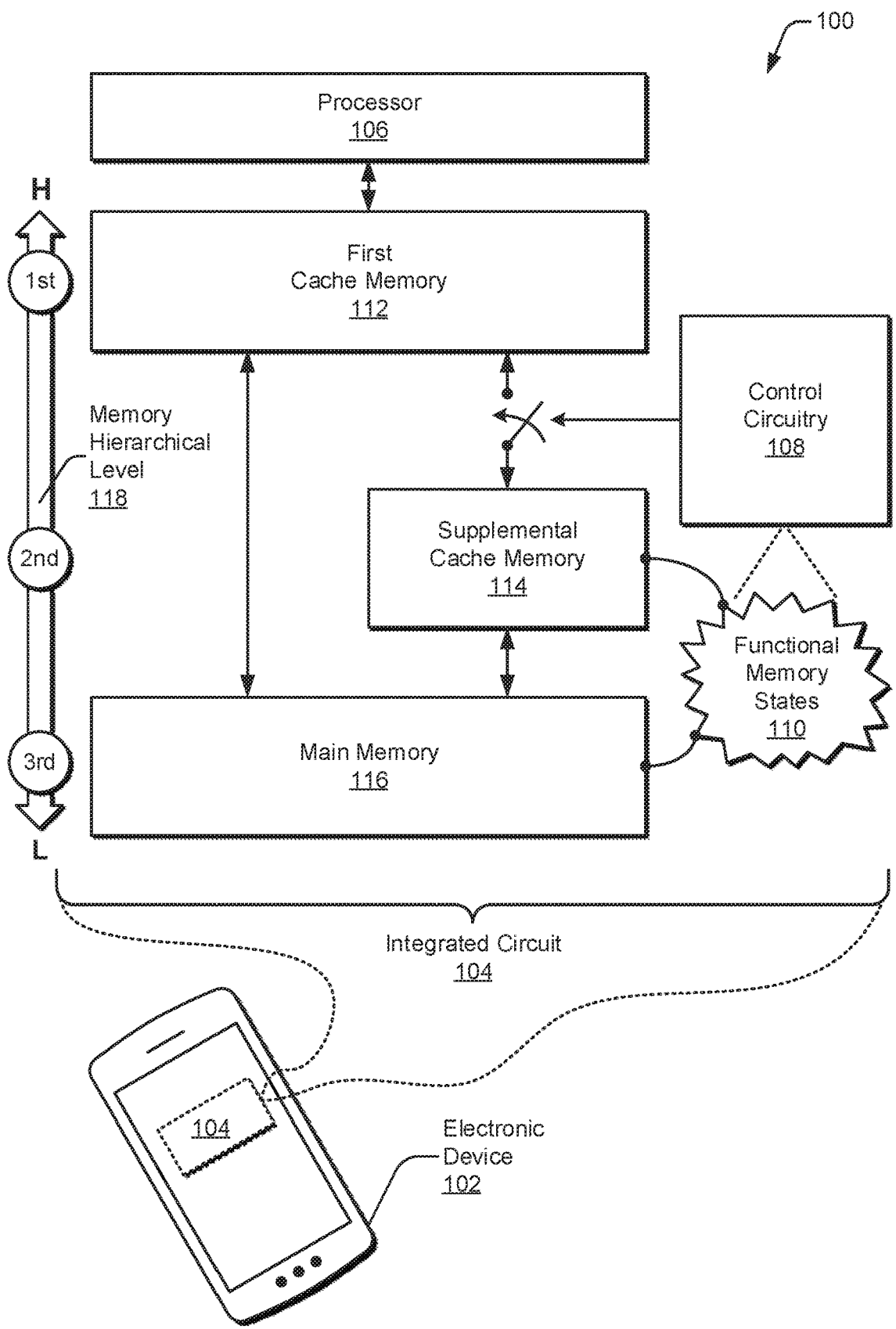
FIG. 1 illustrates an example environment including an integrated circuit in which power-conserving cache memory usage can be implemented.

The circuits of electronic devices consume significant quantities of power during operation. Reducing such power consumption can lower energy costs, decrease negative environmental impacts, and extend battery life. One circuit type that consumes an appreciable amount of power is dynamic random-access memory (DRAM). To reduce the amount of power consumed by a DRAM block, the DRAM block can be powered down. However, completely powering down DRAM causes stored information to be lost. To avoid losing the stored contents of a DRAM block, the DRAM block can instead be partially powered down. One scheme for partially powering down a DRAM block is referred to as a self-refresh mode. If a DRAM block is in a self-refresh mode, the stored memory contents are maintained while power is still reduced.

Unfortunately, the DRAM block is generally inaccessible while operating in self-refresh mode. To access the memory contents, the DRAM block is awakened, which typically takes an appreciable amount of time. If an executing program is unable to continue until the memory contents are accessed, the program is stalled during the awakening time, and a user is forced to wait or is otherwise subjected to a slow device and a poor user experience. Consequently, program execution can be faster and the user experience can be improved if the frequency of DRAM awakening is reduced. To reduce the frequency at which a sleeping DRAM block is awakened, cache memory can be employed.

Originally, cache memory was primarily employed to provide a faster response time when a processor was accessing memory to obtain instructions or data. Cache memory is typically created using a memory type that is faster, but more expensive, than DRAM, such as static random-access memory (SRAM). Accordingly, an amount of cache memory in a system is smaller than an amount of main memory, and the cache memory stores a subset of the memory contents held by the main memory. Cache memory is therefore responsible for storing information—instructions or data— that a processor is more likely to use soon or repeatedly.

However, cache memory can also be used to save power. For example, cache memory can enable DRAM to enter a lower-power, self-refresh mode. Powering down a DRAM chip by placing it into a self-refresh mode saves an appreciable amount of power (e.g., about 60 milliwatts (mW) per gigabyte (GB) of memory). While the cache memory is satisfying memory access requests issued by the processor, the DRAM can continue to operate in the self-refresh mode. Unfortunately, the cache memory will eventually fail to be able to respond to, or otherwise accommodate, a memory access request—which is called a cache miss for read operations or a cache overflow for write operations, and the DRAM will be awakened. Because the awakening process takes time and consumes power, an electronic device's energy efficiency and computing performance is generally better if cache misses can be delayed or rendered less frequent. Thus, energy efficiency can be increased and program execution can be expedited by decreasing the occurrences of cache misses. One approach to decreasing the impacts of cache misses is to increase a length of time a program can be executed using cache memory without relying on main memory. This is referred to herein as executing a cache-resident program.

An operating system can run as a cache-resident program in certain situations. For example, an electronic device (e.g., a smartphone, smartwatch, or phablet) may operate for relatively long periods of time when the operating system runs, but the executing code is localized to a relatively small fraction of the total code and related data of the operating system, with or without one or more applications also running. This level of usage for the operating system is referred to herein as a maintenance mode. To extend battery life, it is beneficial to power down as many chips, or cores thereof, as is feasible given current performance demands. During maintenance mode for an operating system, power can be reduced if DRAM can be kept in the self-refresh mode for longer periods of time.

Central processing units (CPUs) typically have multiple cache levels, such as an L1 cache and an L2 cache. The CPU attempts to have memory requests serviced first through the L1 cache, and then the L2 cache tries to handle L1 cache misses. Some CPUs have an L2 cache that is large enough to hold much of the instructions and data for the maintenance mode of the operating system. If there is an L2 cache miss, however, the DRAM is accessed, which involves waking up the memory. Waking the DRAM from the self-refresh mode takes a long time relative to the normal, expected speed of program execution. An L2 cache that is just half full likely experiences some cache misses, such as 1% of memory accesses—which is roughly one per microsecond (ms). These cache misses can occur with significant space remaining in the L2 cache because too many memory addresses overlap on the same cache line, even with fairly high N-way set associative caching (e.g., with "N" being up to 16). Consequently, awakening the DRAM for every L2 cache miss becomes prohibitive in terms of both power and time.

Several approaches can theoretically be adopted to reduce a frequency at which an operating system experiences cache misses while in maintenance mode. As a first example, a fully-associative L2 cache can be deployed that enables any memory location to be cached to any line. However, fully-associative cache memories are relatively slow and are more expensive due to a higher gate count per byte of information stored in the cache memory. As a second example, the code and data information supporting the maintenance mode can be reshuffled to fit the information into an L2 cache that employs a typical number of ways (e.g., N<=16) for a set-associative cache memory. Unfortunately, changing the memory layout of the code and data to make it more tightly packed is prohibitively complicated in general and is infeasible for saving power in this context. A third example approach is to quadruple the size of the L2 cache memory, but this is expensive in terms of chip area, which is directly proportional to cost, and power usage. Given these untenable options, today's computing systems leave DRAM in an active mode while the operating system is running, even if the operating system is in a maintenance mode.

In contrast, some implementations that are described herein enable the DRAM to enter a self-refresh mode while, for instance, the operating system is in a maintenance mode. To do so, a supplemental cache memory is deployed that is responsible for handling those cache lines that overflow an upper level cache. For a fairly wide range of cache loading (e.g., between about ⅛ and ½ of the cache), the probability of overflow in at least one cache line is relatively high, even though the total number of address collisions is small relative to the size of the cache. To leverage this phenomenon, a relatively small, highly-associative supplemental cache memory (e.g., with more than 16 ways per set, such as 64 or 128 ways per set) or fully-associative supplemental cache memory is coupled to the CPU below at least one higher cache level. A supplemental cache memory stores the relatively few lines that overflow the largest on-chip cache. This supplemental cache memory can significantly increase the size and complexity of programs that can be run fully cache-resident with the DRAM in a self-refresh mode and therefore unavailable to the operating system until the DRAM is awakened. Thus, deploying a supplemental cache memory can enable more programs to be run in a cache-resident mode, which can reduce power consumption by enabling DRAM to be powered down more frequently or for longer periods of time.

An example implementation is described next in terms of a CPU in which the largest on-chip cache is an L2 cache. In this scenario, the supplemental cache memory is referred to as an L2.5 cache. Both the L2 and the L2.5 caches are configured to be write-back instead of write-through caches. Here, the L2.5 cache is deployed at a lower operational level than the L2 cache in the sense that the L2.5 cache is responsible for handling caches misses of the L2 cache. However, the L2.5 cache can be significantly smaller than the L2 cache in terms of having fewer gates, occupying less on-chip area, or storing fewer bytes of information. Because of its relatively small size, the L2.5 cache can be constructed to be more highly associative (which involves building more gates per cache line) than the L2 cache. Further, because the majority of memory accesses are served by the L2 cache, the L2.5 cache can have a slower response time than the L2 cache. The L2 and the L2.5 caches together enable a larger and more complex program to be fully cache-resident as compared to the L2 cache working alone. Thus, for a relatively small increase in total cache gate count, the size of a program that can be run in a cache-resident mode can increase by a factor of approximately two to four times, up to almost an order of magnitude in some situations.

In terms of power management, the L2.5 cache can be powered and operational whenever the corresponding processor is powered and active. Alternatively, the L2.5 cache can be opportunistically engaged and therefore active part time. Generally, the L2.5 cache does not save power if the processor is running a codebase that is too large to fit in the L2 cache because the DRAM remains powered. Because the L2.5 cache consumes power, the L2.5 cache can generally be in an off state but can be turned on by the operating system if the operating system is entering a maintenance mode. When turned on, the L2.5 cache can shadow DRAM reads and buffer writes until DRAM accesses become relatively rare. This rare access of the DRAM is indicative that the currently-active fraction of the codebase is fully resident in a combination of the L2 cache and the L2.5 cache. At this point, the DRAM is placed into a low-power, self-refresh mode. In the event of a cache miss in both the L2 cache and the L2.5 cache, the DRAM is awakened. The effect of the awakening is similar to a long bus stall. After awakening, the DRAM can be left on for some period, during which dirty lines in the L2.5 cache can be written back to the DRAM opportunistically. When the operating system signals that it is coming out of the maintenance mode, or memory management hardware detects a high rate of L2.5 cache misses, any remaining dirty lines in the L2.5 cache are written out to the DRAM, and then the L2.5 cache can be powered down.

In systems that use direct memory access (DMA) while the operating system is in maintenance mode and the DRAM is in the low-power mode, the DMA is directed to go through the L2 cache or the L2.5 cache, rather than directly to the DRAM. This can be implemented if, for instance, the DMA path involves the integrated circuit chip that includes the CPU and the L2.5 cache (e.g., in a system-on-chip (SoC)

environment). Thus, the combination of the two caches can handle small amounts of DMA data without overflowing or awakening the DRAM. Further, DMA operations can proceed while the operating system is executing in the maintenance mode.

Example implementations in various levels of detail are discussed below with reference to the associated figures. The discussion below first describes an example operating environment, then example schemes and hardware, followed by example methods, and ends with an example electronic device and related example aspects.

Example Environment

FIG. 1 illustrates an example environment 100 including an integrated circuit 104 in which power-conserving cache memory usage can be implemented. As shown, the environment 100 includes an electronic device 102. Different examples of electronic devices 102 are described below with reference to FIG. 2. The electronic device 102 includes at least one integrated circuit 104. The integrated circuit 104 includes multiple different portions or cores. These include at least one processor 106, control circuitry 108, a first cache memory 112, a supplemental cache memory 114, and a main memory 116. As described below with reference to FIGS. 4 and 5, different memories—such as the supplemental cache memory 114 or the main memory 116—can operate in one or more functional memory states 110.

In example implementations, the processor 106 is communicatively coupled to the first cache memory 112, and the first cache memory 112 is communicatively coupled to the main memory 116. The first cache memory 112 comprises an N-way set associative cache memory, with "N" representing a positive integer. The supplemental cache memory 114 can be selectively engaged to function as a lower-level cache resource for the first cache memory 112. Thus, the supplemental cache memory 114 can be communicatively coupled to the first cache memory 112 and can likewise be coupled to the main memory 116. The supplemental cache memory 114 comprises, for example, a fully associative cache memory or an M-way set associative cache memory, with "M" representing another positive integer that is greater than the positive integer of "N." The main memory 116 can be realized using, for example, dynamic random-access memory (DRAM) that is refreshed to maintain memory contents. In other words, the main memory 116 can be implemented using a memory type that is preserved (e.g., refreshed) so as to maintain memory contents. More generally, the main memory 116 can be implemented using a memory type that is operated in two modes: one in which the memory is readily usable and consumes one amount of power, and another mode in which the memory is not readily usable but consumes another, lower amount of power (including no power, regardless of whether refreshing is involved). For instance, a main memory can be turned off for the latter operational mode and can even relinquish stored information, as long as some other memory can restore the relinquished information when the former operational mode is reinstated.

The multiple memories are arranged in accordance with multiple memory hierarchical levels 118. As indicated by the vertical arrow on the left of FIG. 1, memory hierarchical levels 118 become higher (H) near the top of the depiction of the integrated circuit 104 and lower (L) near the bottom of the integrated circuit 104. As shown, the first cache memory 112 is on a higher memory hierarchical level 118 than the supplemental cache memory 114. Specifically, the first cache memory 112 is configured at a first memory hierarchical level 118 (or first hierarchical level), the supplemental cache memory 114 is configured at a second memory hierarchical level 118 (or second hierarchical level), and the main memory 116 is configured at a third memory hierarchical level 118 (or third hierarchical level). However, the various memories can be arranged at different memory hierarchical levels 118, and the integrated circuit 104 can have more than three memory hierarchical levels 118.

In example operative implementations, the first cache memory 112 attempts to service memory access requests from the processor 106. If there is a cache miss and the supplemental cache memory 114 is inactive, the main memory 116 provides the requested information. However, if the supplemental cache memory 114 is active, the supplemental cache memory 114 attempts to handle cache misses by the first cache memory 112. In such situations, the main memory 116 can be in a low-power mode that reduces power consumption, such as a self-refresh mode. Example memory access operations are described further below with reference to FIG. 4.

The processor 106 and the various memories at different memory hierarchical levels 118 are described in FIG. 1 in terms of being disposed on a single integrated circuit 104, such as a system-on-chip (SoC). However, principles of power-conserving cache memory usage are applicable to other environments in which the illustrated components can be distributed across multiple integrated circuit chips. For example, the supplemental cache memory 114 may be part of separate integrated circuit chip from the processor 106, or even part of a separate package. As another example, the main memory 116 may be disposed on a different integrated circuit chip. In such a scenario, the chip including the, e.g., DRAM that is serving as the main memory 116 may enter a low-power, self-refresh mode as opposed to a portion of an SoC.

Further, although single components are depicted in FIG. 1, multiple components may be implemented. For instance, there can be multiple main memories 116. Additionally or alternatively, the first cache memory 112 can include two cache memories—e.g., one for instruction information and one for data information. If so, the supplemental cache memory 114 can likewise be divided into two cache memories or two cache memory portions, with each portion respectively associated with instruction information or data information, or the supplemental cache memory 114 can still be implemented as a unified cache that stores instruction and data information together. As another example, each illustrated component may include multiple components. For instance, although the first cache memory 112 is depicted as a monolithic unit, the first cache memory 112 can be implemented using two, three, or more levels of cache with different sizes, speeds, or architectures.

Figure 2:
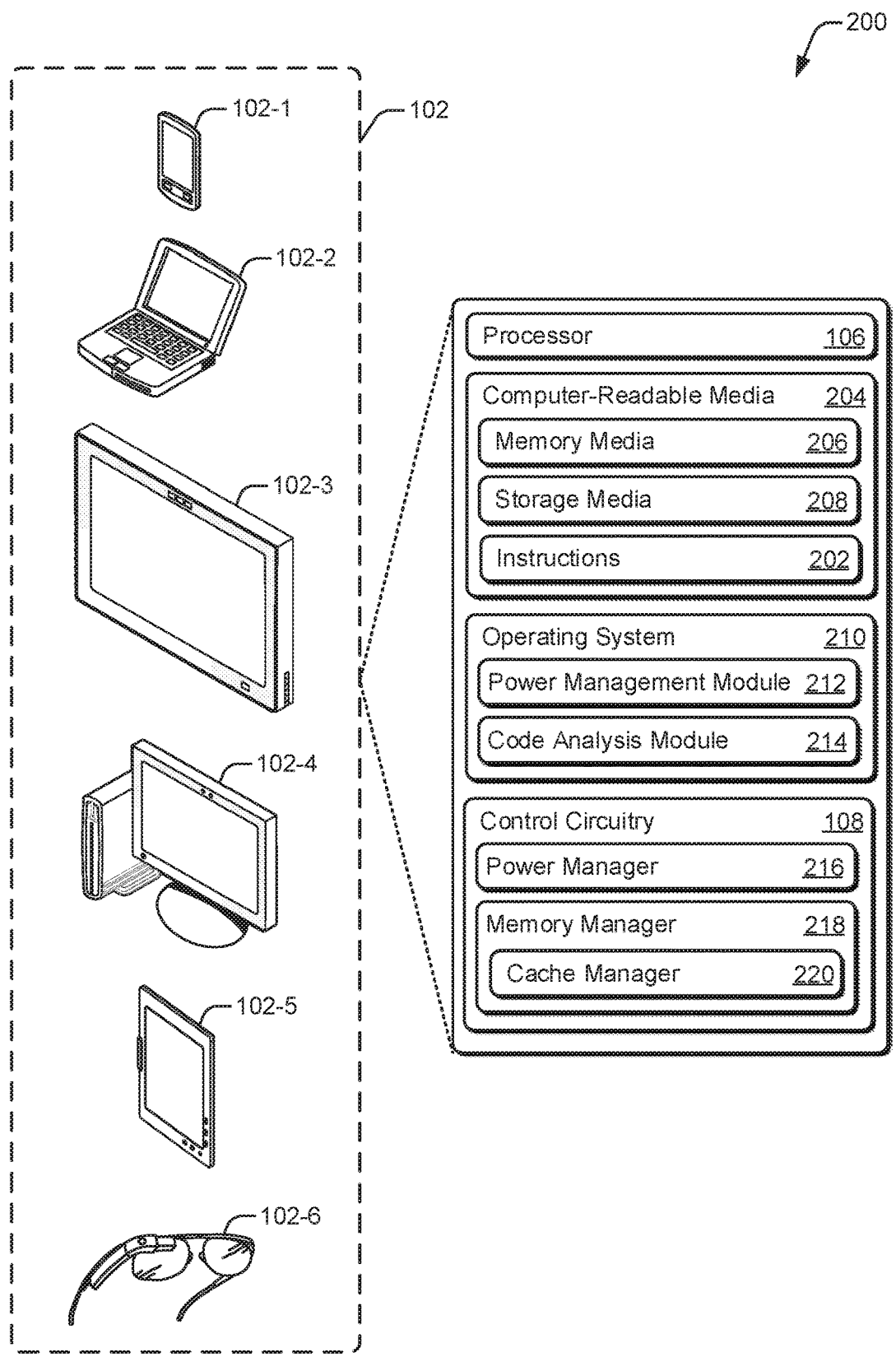
FIG. 2 illustrates other aspects of an example environment in which power-conserving cache memory usage can be implemented.

FIG. 2 illustrates other aspects of an example environment 200 in which power-conserving cache memory usage can be implemented. The electronic device 102 is illustrated with various non-limiting example devices: a smartphone 102-1, a laptop 102-2, a television 102-3, a desktop 102-4, a tablet 102-5, and a wearable device 102-6. As shown on the right, the electronic device 102 includes one or more processors 106 and computer-readable media 204. The computer-readable media 204 includes memory media 206 and storage media 208, either or both of which can store, hold, or otherwise include instructions 202, data, code, other information, and so forth. Although not shown in FIG. 2, the computer-readable media 204 can include the first cache memory 112, the supplemental cache memory 114, and/or the main memory 116. Applications (not shown) or an operating system 210 that is embodied as computer-readable instructions 202 on the computer-readable media 204 can be executed by the processor 106 to provide some of the functionalities described herein.

As illustrated, the operating system 210 includes a power management module 212 and a code analysis module 214, which can be stored as part of the computer-readable media 204. The power management module 212 monitors and adjusts the power being used by one or more integrated circuit chips, or portions thereof. The power management module 212 can command integrated circuits to power down, such as by writing to a register to cause an operation mode to be switched. The code analysis module 214 estimates if at least one block of code, such as an application or a portion of the operating system 210, is sufficiently small so as to be likely to be executable while being cache-resident. The code analysis module 214 can perform such an estimation by predicting execution behavior of the code block, by observing execution behavior of the code block, some combination thereof, and so forth. In some cases, the code analysis module 214 is capable of estimating a likelihood that multiple code blocks can jointly execute in a cache-resident mode.

The electronic device 102 also includes control circuitry 108. The control circuitry 108 includes a power manager 216 and a memory manager 218. The memory manager 218 includes a cache manager 220. As indicated by the integrated circuit 104 depicted in FIG. 1, the control circuitry 108 can be implemented at least partially in hardware, such as on at least one integrated circuit chip. In some implementations, the power manager 216 and the memory manager 218 are integrated on a same chip. In other implementations, the power manager 216 and the memory manager 218 are integrated on different chips. For example, the power manager 216 may be integrated on a power management integrated circuit (PMIC) chip while the memory manager 218, as well as at least the processor and cache memories, are integrated on another chip. Additionally or alternatively, the control circuitry 108 can be implemented in software, firmware, hardware, fixed-logic circuitry, some combination thereof, and so forth. Aspects of the power manager 216 and the memory manager 218 are described below with reference to FIG. 4.

Figure 3:
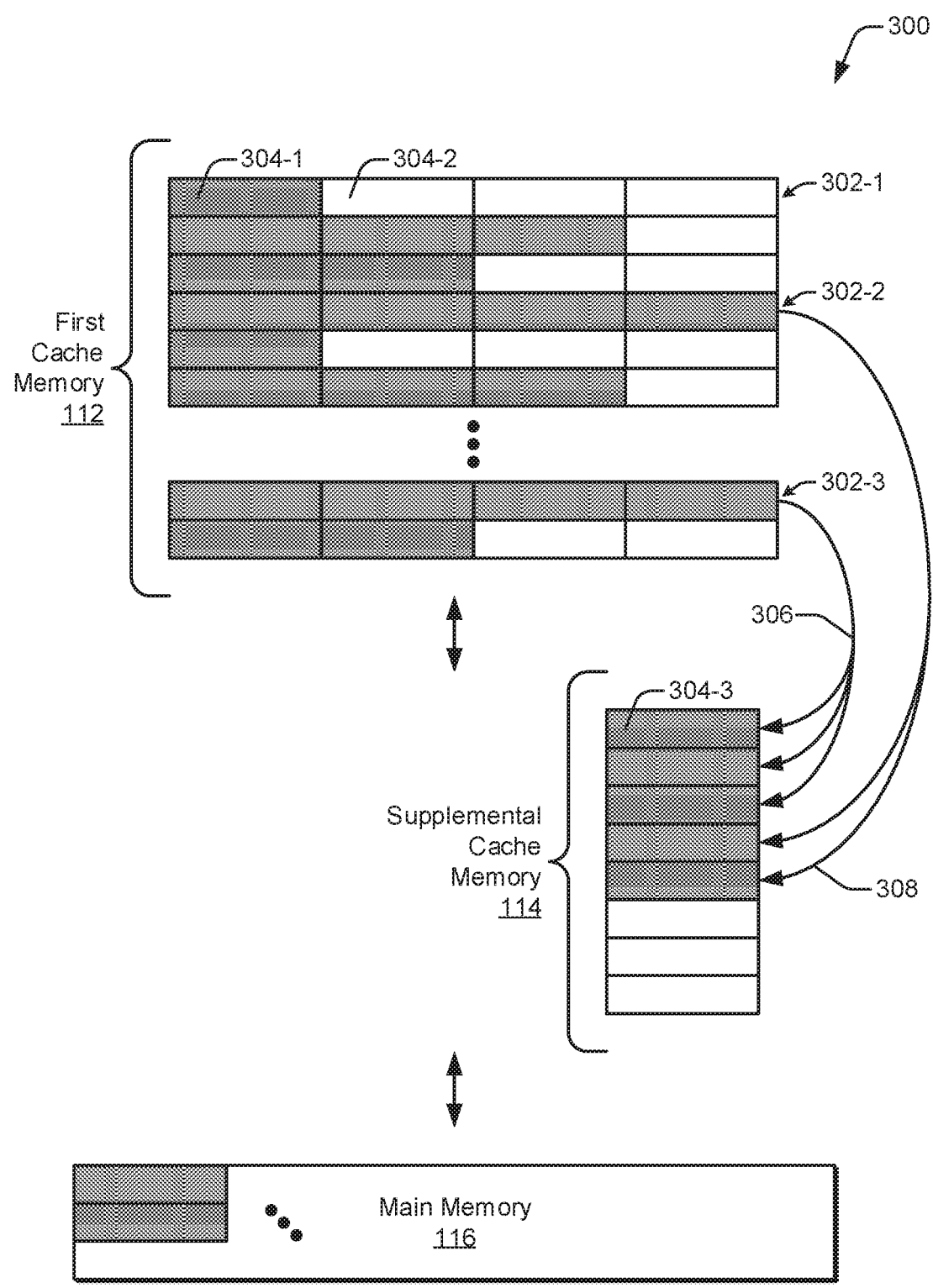
FIG. 3 illustrates an example mapping of memory locations to different lines of two cache memories.

FIG. 3 illustrates an example mapping 300 of memory locations to lines of two cache memories. FIG. 3 depicts the first cache memory 112, the supplemental cache memory 114, and the main memory 116. In each memory, memory locations that contain stored information are shaded. As shown, the mapping 300 pertains to the first cache memory 112 and the supplemental cache memory 114. The first cache memory 112 is organized in an example 4-way set associative arrangement, as represented by the four columns.

The first cache memory 112 includes multiple cache sets or rows 302. Three cache rows are explicitly referenced: row 302-1, row 302-2, and row 302-3. Multiple cache lines or blocks 304 are also shown in both caches. Three cache blocks are explicitly referenced: block 304-1, block 304-2, and block 304-3. Each cache block 304 is either filled with information (e.g., shaded grey like the block 304-1) or is empty (e.g., depicted as white or blank like the block 304-2). Of all the blocks from the main memory 116 that are map-able to a given row 302, the four-way set-associative first cache memory 112 can map no more than four different blocks at any one time.

Consider a current state of the first cache memory 112 as indicated by the number of occupied cache blocks 304, which are shaded. Assuming the cache rows 302 implied by the ellipses are filled at a level that is similar to those that are explicitly depicted, the first cache memory 112 is filled just slightly over halfway. However, the first cache memory 112 can still experience cache misses due to filled rows. The row 302-2 and the row 302-3 are both filled because all four ways of each have blocks occupied by valid information. Consequently, if any further memory requests map to one of these two rows, the first cache memory 112 replaces one of the occupied blocks in that row, such as the row 302-2. If the supplemental cache memory 114 is not present (or is currently inactive), the memory system will wake up the main memory 116 to satisfy this memory request, even though the first cache memory 112 is only about half full.

In contrast, if the supplemental cache memory 114 is present and operationally active, the supplemental cache memory 114 can be used to satisfy this memory request. Although other levels of associativity can be employed, the supplemental cache memory 114 is implemented as a fully-associative cache memory in the illustrated example of FIG. 3. Thus, any block of memory can be stored at any location of the supplemental cache memory 114. As indicated by the arrow 306, blocks mapping to the row 302-3 are already occupying three spaces in the supplemental cache memory 114. As indicated by the arrow 308, blocks mapping to the row 302-2 already occupy two spaces in the supplemental cache memory 114. As a result, the memory request corresponding to the row 302-2 that misses in the first cache memory 112 can be handled by the supplemental cache memory 114.

In this manner, a relatively small supplemental cache memory 114 can accommodate the rows 302 of the first cache memory 112 that overflow, e.g., while the first cache memory 112 is only partially filled overall. This scheme increases the size of a code block that can be run fully cache-resident. This scheme therefore increases the frequency at which the main memory 116 can be permitted to enter a low-power, self-refresh mode or increases a duration at which the main memory 116 can be permitted to remain in the low-power, self-refresh mode. Consequently, power can be conserved by employing the supplemental cache memory 114 as described further with reference to FIGS. 4 and 5.

Example Components and Techniques

Figure 4:
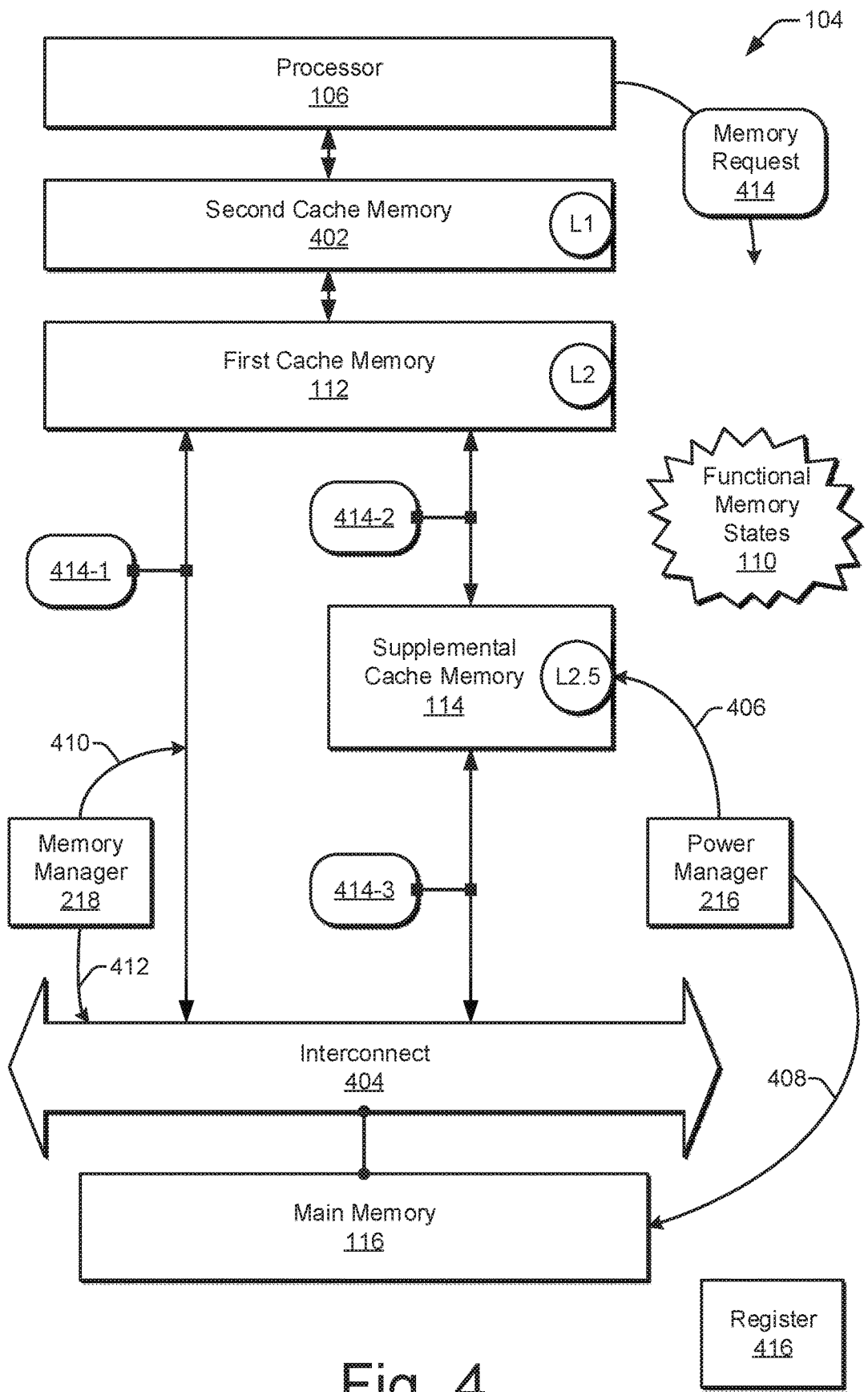
FIG. 4 illustrates an example integrated circuit including a first cache memory, a supplemental cache memory, and a main memory.

FIG. 4 illustrates an example integrated circuit 104 having a multi-level hierarchical memory system including the first cache memory 112, the supplemental cache memory 114, and the main memory 116. FIG. 4 further illustrates the processor 106 and an indication of the functional memory states 110 of the supplemental cache memory 114 or the main memory 116. The integrated circuit 104 can include the power manager 216 and the memory manager 218 from FIG. 2. The power manager 216 or the memory manager 218 can be part of the control circuitry 108 (of FIG. 1). The depiction of the integrated circuit 104 in FIG. 4 additionally includes: a second cache memory 402; an interconnect 404; control signals 406, 408, 410, and 412; a memory request 414; and a register 416.

As shown, the second cache memory 402 is coupled to the processor 106, and the first cache memory 112 is coupled to the second cache memory 402. Here, the second cache memory 402 is coupled between the processor 106 and the first cache memory 112. The first cache memory 112 is coupled to the main memory 116 via the interconnect 404. The supplemental cache memory 114 is coupled to the first cache memory 112 and to the main memory 116 via the interconnect 404. The memory manager 218 is responsible for controlling interactions between the main memory 116 and other components, such as the first cache memory 112. The power manager 216 is responsible for causing different components, such as the supplemental cache memory 114 or the main memory 116, to enter different power states, such as awake, asleep, self-refresh, and so forth.

A hierarchical memory system has multiple memory levels, such as one or more levels of cache memory and at least one main memory. A memory hierarchical level 118 (of FIG. 1) is usually established relative to a processor. Thus, in FIG. 4, the second cache memory 402 functions as a first memory hierarchical level 118; the second cache memory 402 is therefore designated as an "L1" cache. The first cache memory 112 functions as a second memory hierarchical level 118; the first cache memory 112 is therefore designated as an "L2" cache. The supplemental cache memory 114 can function as a part-time, or selectively-activated third memory hierarchical level 118 that is coupled between the first cache memory 112 and the main memory 116. The supplemental cache memory 114 is therefore designated as an "L2.5" cache. In this hierarchical memory system example, the main memory 116 generally functions as a third memory hierarchical level 118 that can enter a low-power mode if the supplemental cache memory 114 is temporarily active as the third memory hierarchical level 118.

However, implementations of power-conserving cache memory usage are applicable to other hardware environments. For example, there may be zero or more than one cache memory positioned between the first cache memory 112 and the processor 106. Also, there may be one or more cache memories operationally coupled between the supplemental cache memory 114 and the main memory 116. Moreover, the main memory 116 can comprise or function as a cache memory with respect to one or more other, lower-level memories. Examples of other lower-level memories include a slower or larger solid-state memory and a disk-based memory.

In operation, the processor 106 executes code (not shown). As part of the code execution, the processor 106 issues a memory request 414 to obtain additional information, such as instructions to execute or data that is the object of the instructions. Each memory request 414 typically identifies targeted information via a corresponding memory address location. The memory request 414 is provided to the hierarchical memory system, which eventually satisfies the memory request 414 from at least one level of the hierarchical memory system. For example, if the second cache memory 402 contains the targeted information, the second cache memory 402 provides the desired information, and typically does so faster than any other memory except operational registers within the processor 106. On the other hand, if the second cache memory 402 does not contain the targeted information, a cache miss has occurred at the L1 cache level, and the first cache memory 112 attempts to respond to the memory request 414.

If the first cache memory 112 contains the information targeted by the memory request 414, the first cache memory 112 provides the desired information, typically faster than lower levels of memory. On the other hand, if the first cache memory 112 does not contain the targeted information, a cache miss has occurred at the L2 cache level, and the first cache memory 112 passes the memory request 414 to a lower memory level. Alternatively, the memory request 414 can be provided to one or more lower-level memories while the first cache memory 112 is determining if the targeted information is present at the first cache memory 112. Two scenarios are described below for handling a cache miss by the first cache memory 112. The main memory 116 is accessed as a primary option in the first scenario, but the main memory 116 is accessed as a secondary option in the second scenario.

In the first scenario, the supplemental cache memory 114 is inactive, so the main memory 116 is the primary option for responding to the memory request 414. For clarity, different versions of the memory request 414 are depicted at different locations of the illustrated architecture and indicated with a different extension (e.g., a memory request 414-1). The first cache memory 112 forwards a memory request 414-1 to the main memory 116 via the interconnect 404, which is controlled by the memory manager 218. The main memory 116 responds to the memory request 414-1 by providing the requested information to the processor 106 via the interconnect 404. In one approach, the requested information is forwarded from the main memory 116 to the processor 106 through the first cache memory 112 and the second cache memory 402. Alternatively, one or more caches can be bypassed as the requested information is provided to the processor 106.

In the second scenario, the supplemental cache memory 114 is active, so the main memory 116 is the secondary option for responding to the memory request 414. Thus, the first cache memory 112 forwards a memory request 414-2 to the supplemental cache memory 114. If the supplemental cache memory 114 has the requested information, the supplemental cache memory 114 provides the requested information to the processor 106. The requested information can be forwarded to the processor 106 through the first cache memory 112 and the second cache memory 402 or directly to the processor 106. If, on the other hand, the supplemental cache memory 114 does not have the requested information, the memory system resorts to accessing the main memory 116. However, in some situations, the main memory 116 is in a low-power mode, such as a self-refresh mode. To enable access to the main memory 116, the power manager 216 awakens the main memory 116. The supplemental cache memory 114 forwards a memory request 414-3 to the main memory 116 via the interconnect 404. Alternatively, the memory manager 218 or the first cache memory 112 may provide the memory request 414-1 to the main memory 116 via the interconnect 404. After being awakened, the main memory 116 responds to the memory request 414-1 or 414-3 by providing the requested information to the processor 106 via the interconnect 404.

Generally, the main memory 116 or the supplemental cache memory 114 can be operated in different power modes or operational modes in accordance with the multiple functional memory states 110 to conserve power while responding to memory requests 414. Four example functional memory states 110 are described below with reference to FIG. 5. FIGS. 6-9 depict examples of the architecture illustrated in FIG. 4 in a respective one of the four example functional memory states 110 that are illustrated in FIG. 5.

Figure 5:
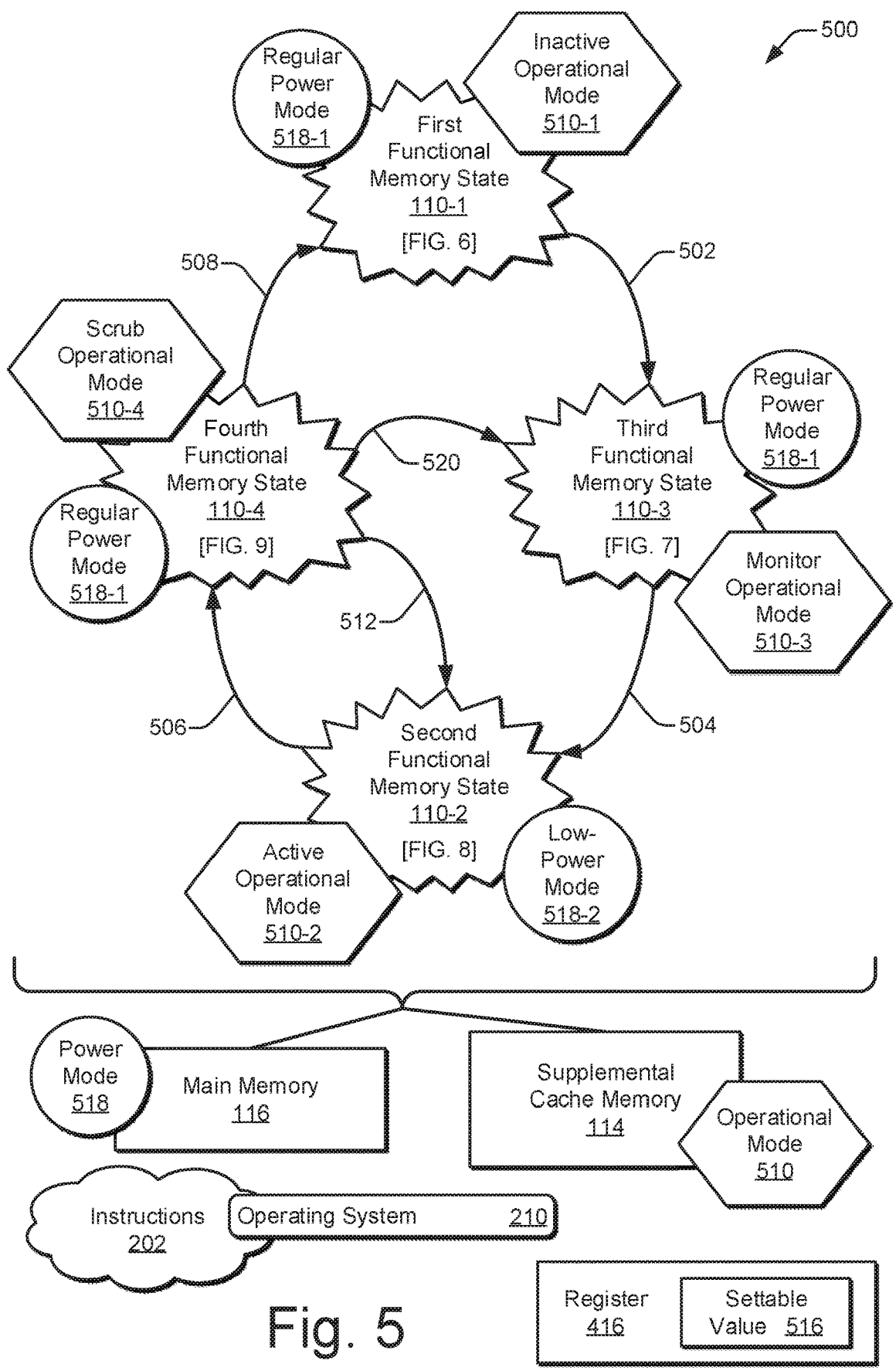
FIG. 5 illustrates an example of multiple functional memory states that correspond to the supplemental cache memory and the main memory, including first through fourth functional memory states.

FIG. 5 illustrates generally at 500 multiple functional memory states 110-1 to 110-4 that correspond to the supplemental cache memory 114 and the main memory 116. For each functional memory state 110, the supplemental cache memory 114 corresponds to, or is functioning in, an operational mode 510. Starting at the top of FIG. 5 and moving clockwise around the state diagram, example operational modes include: an inactive operational mode 510-1, a monitor operational mode 510-3, an active operational mode 510-2, and a scrub operational mode 510-4. Similarly, for each functional memory state 110, the main memory 116 corresponds to, or is functioning in, a power mode 518, as is described below.

Figure 6:
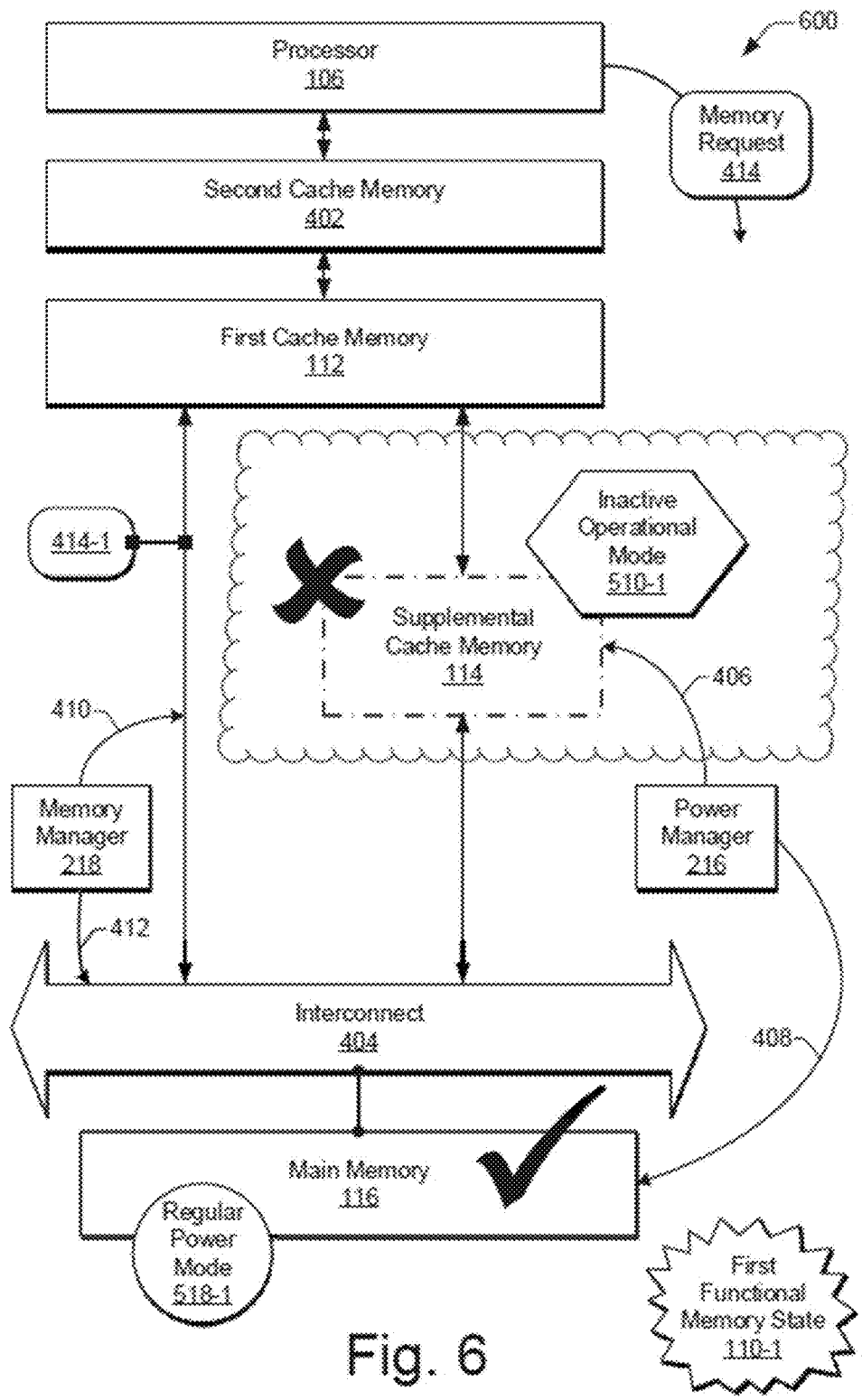
FIG. 6 illustrates the integrated circuit in an example first functional memory state.

In a first functional memory state 110-1, the supplemental cache memory 114 is in the inactive operational mode 510-1, and the main memory 116 is in a regular power mode 518-1. In the regular power mode 518-1, the main memory 116 is awake and is accessible for memory read and write operations. An example of the first functional memory state 110-1 is depicted in FIG. 6 and described below. From the first functional memory state 110-1, the memory system can transition to a third functional memory state 110-3, as indicated by an arrow 502. In alternative implementations, the supplemental cache memory 114 can be active continuously or for extended periods of time, even when the main memory 116 is in the regular power mode 518-1. The supplemental cache memory 114 can be kept active with implementations in which, for example, the supplemental cache memory 114 can respond faster to memory requests than can the main memory 116. In such situations, the ability to increase processing throughput may outweigh the additional power consumption of the supplemental cache memory 114, especially for memory-access patterns involving randomly-accessed data.

Figure 7:
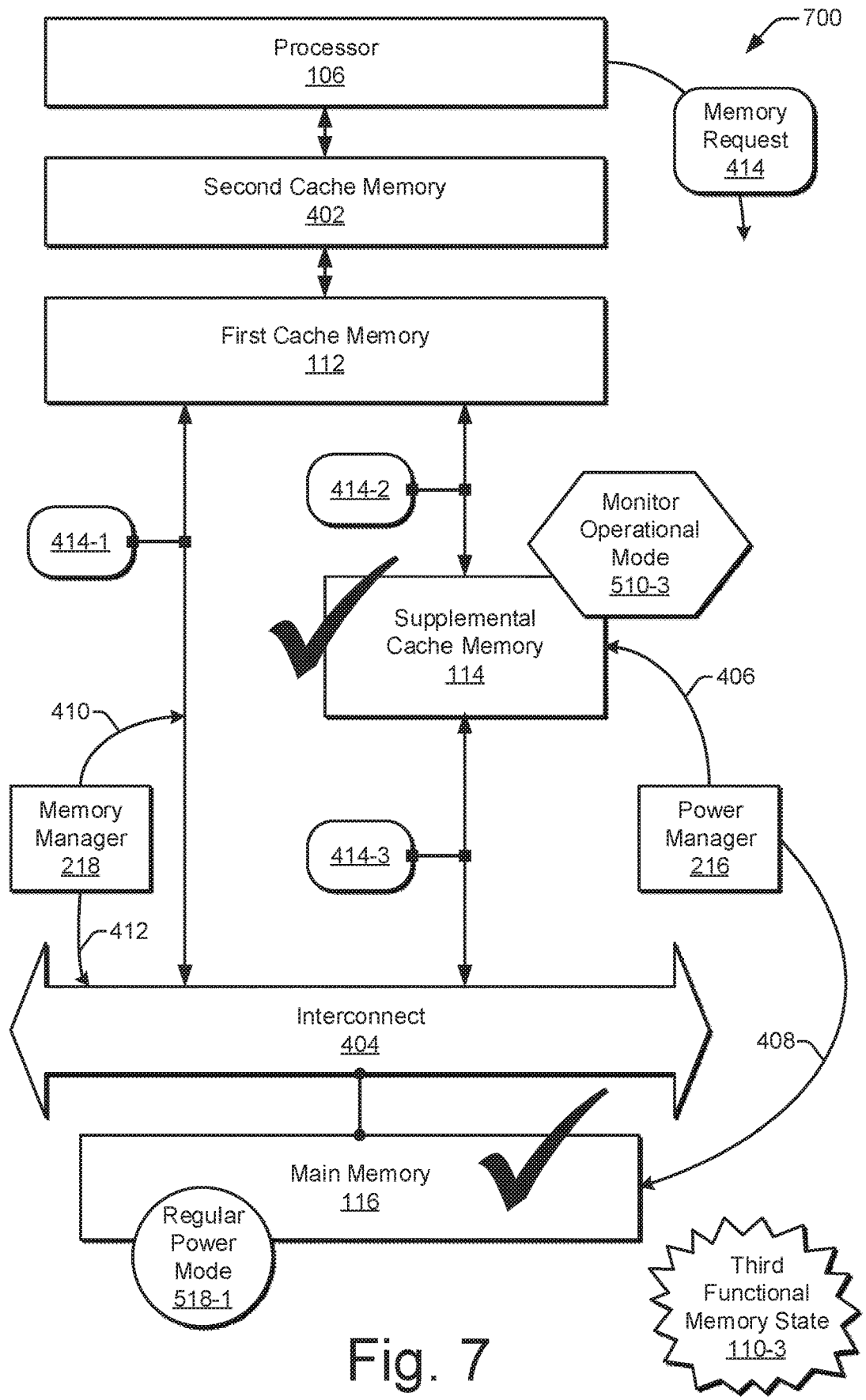
FIG. 7 illustrates the integrated circuit in an example third functional memory state, which can serve as a transitional state from the first functional memory state to the second functional memory state.

In the third functional memory state 110-3, the supplemental cache memory 114 is in the monitor operational mode 510-3, and the main memory 116 continues to operate in the regular power mode 518-1. An example of the third functional memory state 110-3 is depicted in FIG. 7 and described below. While the supplemental cache memory 114 is in the monitor operational mode 510-3, the control circuitry 108 estimates an impact of activity of the main memory 116 by tracking cache misses or by monitoring utilization of the interconnect 404. From the third functional memory state 110-3, the memory system can transition to a second functional memory state 110-2, as indicated by an arrow 504, based on the estimated impact of activity of the main memory 116 exceeding a threshold amount (e.g., a frequency of memory accesses or a time between consecutive memory accesses). Alternatively, for a software-controlled implementation, a transition to the second functional memory state 110-2 can be triggered by tracking memory usage, by predicting information locality for code to be executed, and so forth.

Figure 8:
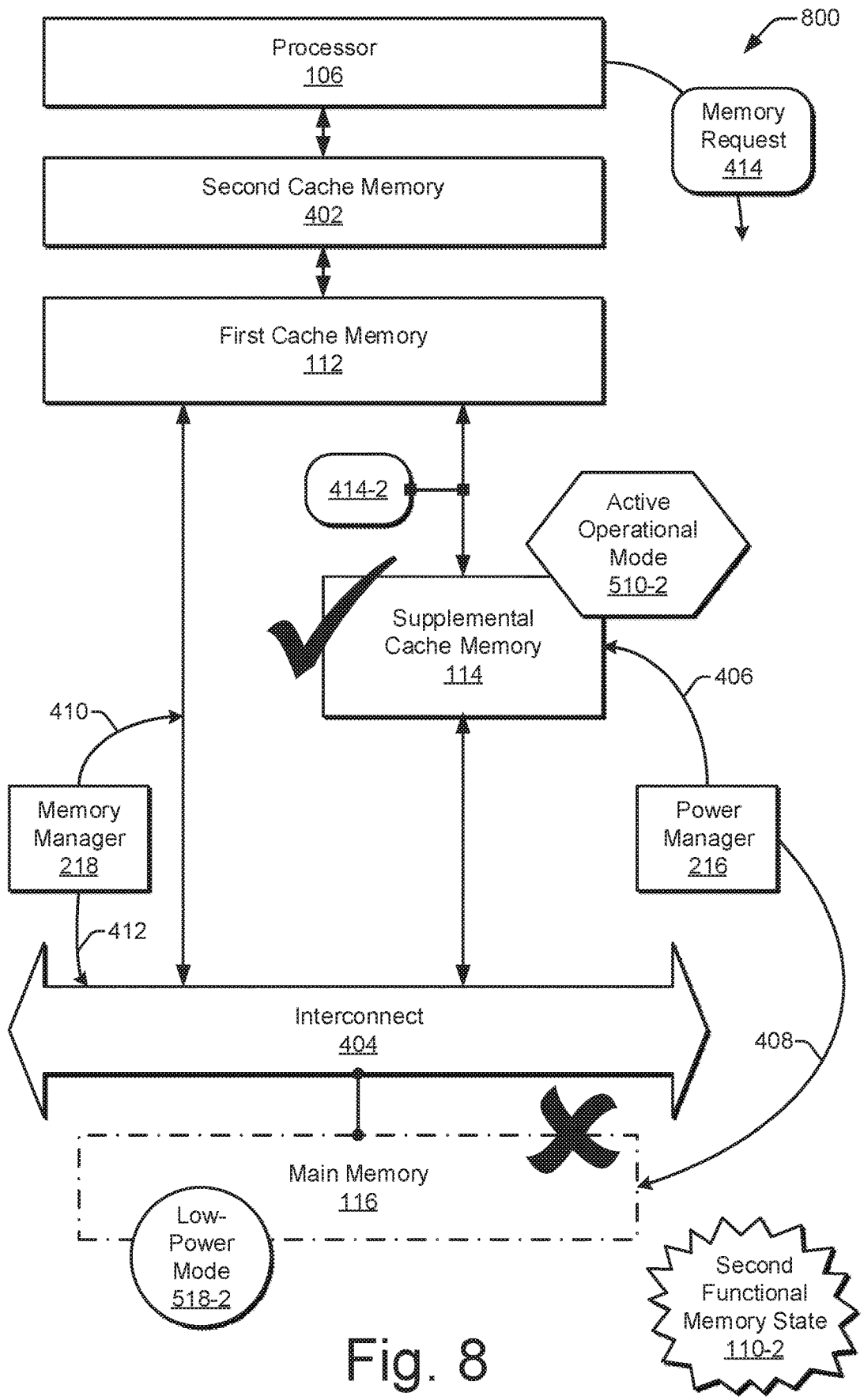
FIG. 8 illustrates the integrated circuit in an example second functional memory state.

In the second functional memory state 110-2, the supplemental cache memory 114 is in the active operational mode 510-2, and the main memory 116 has been transitioned to operate in a low-power mode 518-2. In the low-power mode 518-2, the main memory 116 is inaccessible for memory requests until the memory is awakened. The main memory 116 uses less power in the low-power mode 518-2 as compared to the regular power mode 518-1. An example of a low-power mode 518-2 is a self-refresh mode. An example of the second functional memory state 110-2 is depicted in FIG. 8 and described below. From the second functional memory state 110-2, the memory system can transition to a fourth functional memory state 110-4 due e.g. to a cache miss or cache overflow, as indicated by an arrow 506.

Figure 9:
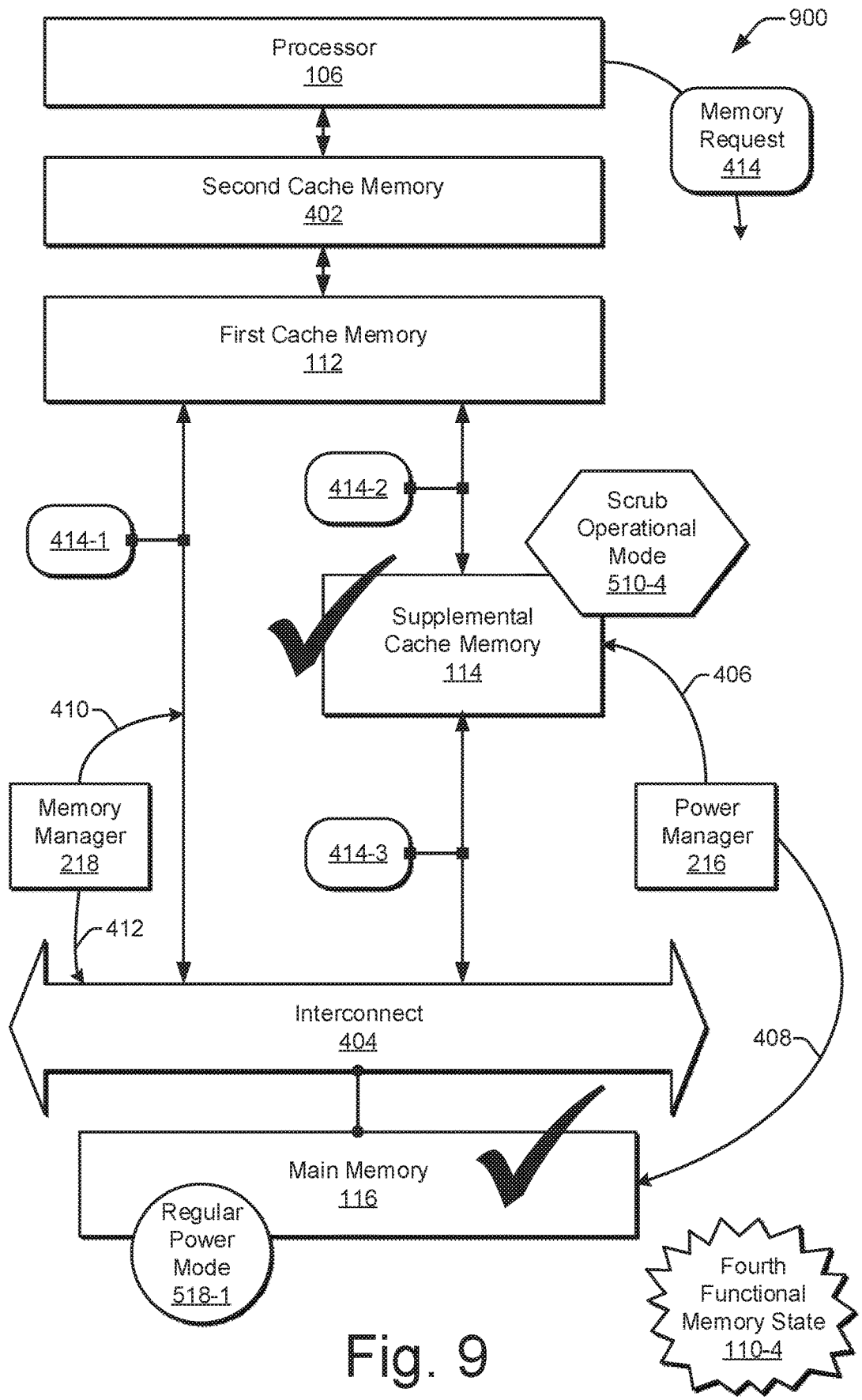
FIG. 9 illustrates the integrated circuit in an example fourth functional memory state, which can serve as a transitional state from the second functional memory state to the first functional memory state.

In the fourth functional memory state 110-4, the supplemental cache memory 114 is in the scrub operational mode 510-4, and the main memory 116 is again operating in the regular power mode 518-1. An example of the fourth functional memory state 110-4 is depicted in FIG. 9 and described below. From the fourth functional memory state 110-4, the memory system can transition to the first functional memory state 110-1, as indicated by an arrow 508. Alternatively, the memory system can transition back to the second functional memory state 110-2 as indicated by an arrow 512 or back to the third functional memory state 110-3 as indicated by an arrow 520, as is described below.

Some hardware-controlled implementations may include the register 416, which can hold a settable value 516. The settable value 516 can comprise at least one bit, an interrupt indication, an alphanumeric variable, and so forth. In example operations, the settable value 516 controls a functional memory state 110 in which the memory system is to operate or establishes whether hardware is empowered to control switching between functional memory states 110. If present, the operating system 210 or an application can adjust the settable value 516. The operating system 210 can be implemented as instructions 202 that are executable by one or more processors, such as the processor 106 (e.g., of FIG. 4).

In some implementations, the operating system 210 causes code to execute on the processor 106. Based on the code (e.g., processor-executable instructions 202), the operating system 210 adjusts (or other instructions 202 adjust) the settable value 516 to selectively enable the supplemental cache memory 114 to operate as a lower-level cache resource with respect to the first cache memory 112. The operating system 210 can analyze the code by, for example, determining a size of the code or observing a memory usage pattern of the code during execution. The memory usage pattern can pertain, for instance, to information locality—e.g., code locality or data locality for memory accesses. Thus, the adjusting of the settable value 516 can be based on analyzing code.

In one approach, the operating system 210 establishes the settable value 516 to permit hardware to selectively activate the supplemental cache memory 114. For example, a value can be set that enables the power manager 216 to transition to/from the second functional memory state 110-2 based on hardware-detectable activity. Activity that is detectable by hardware includes, for instance, traffic on the interconnect 404. In another approach, the operating system 210 establishes the settable value 516 to instruct the hardware to transition the memory system to the third functional memory state 110-3 and to place the supplemental cache memory 114 in the monitor operational mode 510-3. This partially activates the supplemental cache memory 114 to prepare the supplemental cache memory 114 for placing the main memory 116 in the low-power mode 518-2 by loading the supplemental cache memory 114 with information. The latter approach can be triggered by the operating system 210 based on information locality (e.g., code locality or data locality). The operating system 210 may estimate information locality by clearing "enabled" bits on virtual memory pages and monitoring how many pages are hit in a given time period. Machine learning using a neural network, for instance, may be used to predict if the information locality is sufficient to warrant activating the supplemental cache memory 114 and transitioning to a different functional memory state 110.

FIG. 6 illustrates generally at 600 an example of the integrated circuit operating in the first functional memory state 110-1. The power manager 216 places the supplemental cache memory 114 in the inactive operational mode 510-1 using the control signal 406 and the main memory 116 in the regular power mode 518-1 using the control signal 408. In the first functional memory state 110-1, cache misses by the first cache memory 112 are handled by the main memory 116. Consequently, the memory manager 218 provides the memory request 414-1 to the main memory 116 via the interconnect 404, and the main memory 116 responds to the memory request 414-1 with the requested information. In an example implementation, the supplemental cache memory 114 is not clocked/powered, contains no dirty entries, and contains no valid entries for the first functional memory state 110-1.

During the first functional memory state 110-1, the main memory 116 is operating in the regular power mode 518-1 and is thus consuming power. To conserve power with the supplemental cache memory 114 by enabling the main memory 116 to be powered down in a different functional memory state, the operating system 210 (e.g., of FIGS. 2 and 5) can inform the integrated circuit hardware that the operating system 210 is entering a maintenance mode or an executing application predicts a small information locality, such as by adjusting the settable value 516. Alternatively, hardware can make this decision by monitoring memory operations or interconnect traffic. In response, the supplemental cache memory 114 can be transitioned to the monitor operational mode 510-3 of the third functional memory state 110-3.

FIG. 7 illustrates generally at 700 an example of the integrated circuit operating in the third functional memory state 110-3. The power manager 216 places the supplemental cache memory 114 in the monitor operational mode 510-3 using the control signal 406, and the main memory 116 continues operating in the regular power mode 518-1. In the third functional memory state 110-3, the main memory 116 is initially the storage entity that is primarily responsible for handling cache misses by the first cache memory 112, as described above with reference to FIG. 6. However, the memory system is attempting to prepare to transition the main memory 116 to the low-power mode 518-2 (e.g., of FIGS. 5 and 8). To do so, the supplemental cache memory 114 stores or reads in the information for cache misses as represented by the memory request 414-3 and writes updates to information already present as represented by the memory request 414-2. Thus, the supplemental cache memory 114 is gradually loaded with information that overflows certain rows of the first cache memory 112, as described above with reference to FIG. 3. As time elapses during this preparatory, monitor operational mode 510-3, the supplemental cache memory 114 eventually becomes the storage entity that is primarily responsible for handling cache misses by the first cache memory 112. During this time, memory requests 414 that are cache misses at the first cache memory 112 can be routed first to the supplemental cache memory 114 to reduce activity on the interconnect 404. Consequently, the memory manager 218 can monitor the interconnect 404 to detect if memory accessing activity of the main memory 116 slows sufficiently to warrant putting the main memory 116 to sleep, or an operating system or application can, based on predictive execution analysis, instruct the memory system to put the main memory 116 to sleep.

Thus, during the monitor operational mode 510-3, the supplemental cache memory 114 can shadow memory accesses to the main memory 116. Over time, the memory manager 218 tracks how frequently the main memory 116 is accessed to service a read miss or a write overflow by both the first cache memory 112 and the supplemental cache memory 114. More specifically, as part of the third functional memory state 110-3, writes can go through to the main memory 116 as well as the supplemental cache memory 114. Reads can be provided from the supplemental cache memory 114 or the main memory 116 (e.g., based on whichever is faster). The reads can be pipelined into the supplemental cache memory 114. Because those read misses and write overflows that are visible to the supplemental cache memory 114 are those that made it through the first cache memory 112, the supplemental cache memory 114 can act like a write-through cache with respect to the main memory 116 in the monitor operational mode 510-3 to keep the main memory 116 up to date.

Alternatively, the supplemental cache memory 114 can be operated in a write-back manner, with write operations written down to the main memory 116 opportunistically as bandwidth or traffic on the interconnect 404 permits (or if a write overflow of the supplemental cache memory 114 occurs). Meanwhile, the memory manager 218 can maintain a "monitor timer" to track elapsed time since the last read miss or write overflow by the supplemental cache memory 114. If the hardware detects that, for instance, an amount of time has transpired that is long relative to a time period for awakening the main memory 116 from a self-refresh mode, the power manager 216 can transition the supplemental cache memory 114 to the active operational mode 510-2 of the second functional memory state 110-2 and can put the main memory 116 to sleep. In another approach to implementing the monitor operational mode 510-3, values that are expected (e.g., predicted) to be used can be proactively loaded into the supplemental cache memory 114 based on analysis of code by an operating system or an application. In yet another approach, the supplemental cache memory 114 can be prepared for the second functional memory state 110-2 using a combined approach in which some values are loaded based on actual memory requests produced from currently-executing code while other values are loaded based on an expected usage resulting from analyzing the code, e.g., responsive to previous or simulated code execution.

FIG. 8 illustrates generally at 800 an example of the integrated circuit operating in the second functional memory state 110-2. The power manager 216 places the supplemental cache memory 114 in the active operational mode 510-2 using the control signal 406 and the main memory 116 in the low-power mode 518-2 using the control signal 408. The power manager 216 can, for instance, command DRAM to enter the self-refresh mode. In the second functional memory state 110-2, cache misses for read operations and cache overflows for write operations of the first cache memory 112 are handled by the supplemental cache memory 114, if the targeted information is present in the supplemental cache memory 114 or if space is available for new write data. To determine if the targeted information is present, a desired address for a read or a write memory request 414 is broadcast (e.g., in hardware) and compared in parallel (e.g., if fully associative) to each of the tag entries of the supplemental cache memory 114. If the requested information is present for a read access memory request, the memory manager 218 accesses the supplemental cache memory 114 based on the memory request 414-2, and the supplemental cache memory 114 responds to the memory request 414-2 with the requested information. For a write access memory request, a determination is made as to whether the targeted address is present in the supplemental cache memory 114. If so, the write is directed to corresponding cache block. If not, any available (e.g., empty) block can be used to store the write data.

During the second functional memory state 110-2, writes are deferred, and the corresponding entry in the supplemental cache memory 114 is marked as dirty. Thus, the supplemental cache memory 114 can function like a write-back cache in this memory state. Responsive to a cache miss or a cache overflow by the supplemental cache memory 114

(e.g., a miss on a read memory request 414 or a full cache status with no matching address on a write memory request 414), the power manager 216 awakens the main memory 116 using the control signal 408 as part of a stall operation. The memory manager 218 causes the main memory 116 to provide the requested information for a read operation or to store the write information for a write operation. The cache miss or cache overflow by the supplemental cache memory 114 precipitates a transition to the fourth functional memory state 110-4. Thus, in addition to cache read misses, in the unlikely event that the supplemental cache memory 114 becomes filled with dirty entries (e.g., overall if fully-associative or within a given set if set-associative) prior to experiencing a read miss, the memory manager 218 can awaken the main memory 116 to accommodate cache write overflow event.

Also during the second functional memory state 110-2, direct memory access (DMA) operations can be performed even while the main memory 116 remains in the low-power mode 518-2. In other words, DMA operations, which are likely to occur while the operating system 210 is in the maintenance mode, can be handled without waking up the main memory 116. In such cases, the memory manager 218 directs DMA operations to the first cache memory 112 or the supplemental cache memory 114. To do so, the memory manager 218 checks each cache in parallel or sequentially (at least until located) to find the targeted address for a read access DMA operation. For a write access DMA operation, the memory manager 218 searches for a suitable (e.g., available) location to store the DMA-sourced data. For DMA write operations, the processor 106 typically reads the incoming information, so such information can be written into a cache (e.g., the first cache memory 112). For DMA read operations—which correspond to outgoing information, the processor will have previously written the information through to one of the caches. Hence, access to information and the consistency of such information is maintained during the second functional memory state 110-2.

FIG. 9 illustrates generally at 900 an example of the integrated circuit operating in the fourth functional memory state 110-4. The power manager 216 places the supplemental cache memory 114 in the scrub operational mode 510-4 using the control signal 406 and the main memory 116 in the regular power mode 518-1 using the control signal 408. In the fourth functional memory state 110-4, the main memory 116 responds to the memory request 414 that precipitated the awakening of the main memory 116. The main memory 116 remains available to handle future cache misses by the first cache memory 112 or the supplemental cache memory 114. Further, dirty cache blocks, particularly of the supplemental cache memory 114, can be opportunistically written back to the main memory 116 because the main memory 116 is now awakened. The power manager 216 can also determine which functional memory state 110 to transition to next—the first, second, or third functional memory state 110-1, 110-2, or 110-3, as described below.

The scrub operational mode 510-4 can function analogously to the monitor operational mode 510-3 of the third functional memory state 110-3 in the sense that both the main memory 116 and the supplemental cache memory 114 are awake and that the supplemental cache memory 114 can shadow memory operations of the main memory 116. With the scrub mode, however, the supplemental cache memory 114 may have dirty entries. Consequently, the memory manager 218 routes read memory requests to the supplemental cache memory 114, in case the targeted block is valid and dirty within the supplemental cache memory 114. To save time, fetches can be initiated at the supplemental cache memory 114 in parallel with the main memory 116, and the read request to the main memory 116 can be, e.g., canceled or discarded if the supplemental cache memory 114 responds first. Further, the monitor timer can be active and counting, like in the monitor operational mode 510-3, while deferred writes from dirty entries of the supplemental cache memory 114 are performed opportunistically.

If the monitor timer expires (which indicates that a transition back to the second functional memory state 110-2 is advisable) while there are remaining dirty entries in the scrub mode, the power manager 216 can still transition to the second functional memory state 110-2 without waiting until all the dirty entries are written back. Generally, if the operating system 210 decides to return to a heavier work load, which is beyond the bounds of the maintenance mode, while the memory system is in the second or third functional memory state 110-2 or 110-3, the operating system 210 can command the memory system to enter the fourth functional memory state 110-4 (e.g., using the settable value 516 or an interrupt). While operating in the fourth functional memory state 110-4 under such a command, the monitor timer can be turned off or ignored, and the power manager 216 can transition to the first functional memory state 110-1 after the supplemental cache memory 114 contains no more dirty entries.

Having generally described the environment in which techniques and apparatuses for power-conserving cache memory usage can be implemented, this discussion now turns to example methods.

Example Methods

Figure 10:
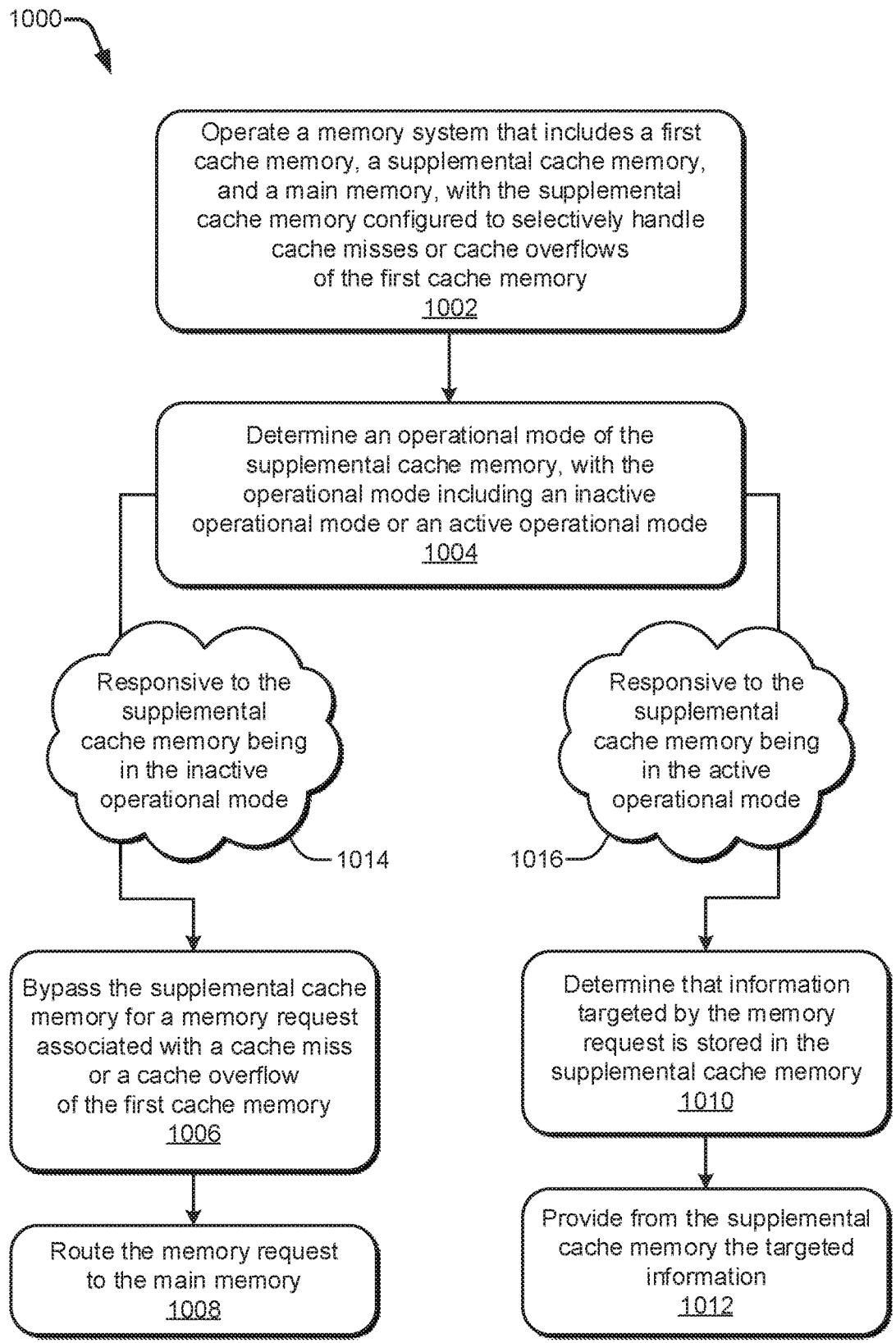
FIG. 10 illustrates example methods for power-conserving cache memory usage.

The following discussion describes methods for power-conserving cache memory usage. These methods can be implemented utilizing the previously described examples, such as the electronic device 102 and the integrated circuit 104 as shown in FIGS. 1 and 2, as well as the electronic device 1100 depicted in FIG. 11. Aspects of these methods are illustrated in FIG. 10, which are shown as operations 1002-1016 that are performed by one or more entities. The orders in which operations of these methods are shown and/or described are not intended to be construed as a limitation, and any number or combination of the described method operations can be combined in any order to implement a method, or an alternate method.

FIG. 10 illustrates example method 1000 for power-conserving cache memory usage, such as by employing a supplemental cache memory 114. At 1002, a memory system that includes a first cache memory, a supplemental cache memory, and a main memory is operated. The supplemental cache memory is configured to selectively handle cache misses or cache overflows of the first cache memory. For example, an operating system 210 or control circuitry 108 can operate a memory system of an integrated circuit 104. The memory system can include a first cache memory 112, a supplemental cache memory 114, and a main memory 116 that are communicatively coupled to each other. The supplemental cache memory 114 is logically positioned at a lower memory hierarchical level 118 than the first cache memory 112 and is configured to selectively handle cache misses of the first cache memory 112.

At 1004, an operational mode of the supplemental cache memory is determined, with the operational mode comprising an inactive operational mode or an active operational mode. For example, a power manager 216 or a memory manager 218 of the control circuitry 108 can determine (e.g., detect, establish, or activate) an operational mode 510 of the supplemental cache memory 114. The operational mode 510 can comprise, for instance, an inactive operational mode 510-1 or an active operational mode 510-2. Additionally or alternatively, the operating system 210 can initiate a transition between two or more functional memory states 110 to establish the operational mode 510 in conjunction with the hardware.

After the operation at 1004, the method 1000 branches at 1014 or 1016. As indicated at 1014, responsive to the supplemental cache memory 114 being in the inactive operational mode 510-1 of a first functional memory state 110-1, the operations at 1006 and 1008 are performed. At 1006, the supplemental cache memory is bypassed for a memory request associated with a cache miss or a cache overflow of the first cache memory. For example, the memory manager 218 can bypass the supplemental cache memory 114 with a memory request 414 that is associated with a cache miss or a cache overflow of the first cache memory 112. At 1008, the memory request is routed to the main memory. For example, the memory manager 218 can route the memory request 414-1 to the main memory 116 via an interconnect 404.

As indicated at 1016, responsive to the supplemental cache memory 114 being in the active operational mode 510-2 of a second functional memory state 110-2, the operations 1010 and 1012 are performed. At 1010, it is determined that information targeted by the memory request is stored in the supplemental cache memory. For example, a control portion of the supplemental cache memory 114 can compare a memory address associated with a memory request 414-2 to respective memory addresses of multiple tags for valid information of the supplemental cache memory 114. A match indicates that targeted information is stored in the supplemental cache memory 114. If a match is not detected (which corresponds to a cache miss for the supplemental cache memory 114) or the supplemental cache has no available blocks (which corresponds to a cache overflow event for the supplemental cache memory 114), the power manager 216 can awaken the main memory 116 to transition the memory system to the fourth functional memory state 110-4. In the fourth functional memory state 110-4, the power manager 216 places the supplemental cache memory 114 in the scrub operational mode 510-4. The main memory 116 is awakened at least long enough to service the read or write memory access operation that the supplemental cache memory 114 was unable to accommodate.

On the other hand, responsive to a determination at 1010 that the targeted information is stored in the supplemental cache memory, the targeted information is provided from the supplemental cache memory at 1012. For example, the supplemental cache memory 114 can respond to the memory request 414-2 with the requested information by forwarding the requested information to the first cache memory 112, a higher-level cache memory, or the processor 106.

The preceding discussion describes methods relating to power-conserving cache memory usage. Aspects of these methods may be implemented in hardware (e.g., fixed logic circuitry), firmware, software, or any combination thereof. These techniques may be realized using one or more of the entities or components shown in FIGS. 1-9 and 11 (electronic device 1100 is described in FIG. 11 below), which may be further divided, combined, and so on. Thus, these figures illustrate some of the many possible systems or apparatuses capable of employing the described techniques. The entities and components of these figures generally represent software, firmware, hardware, whole devices or networks, or a combination thereof.

Example Electronic Device

Figure 11:
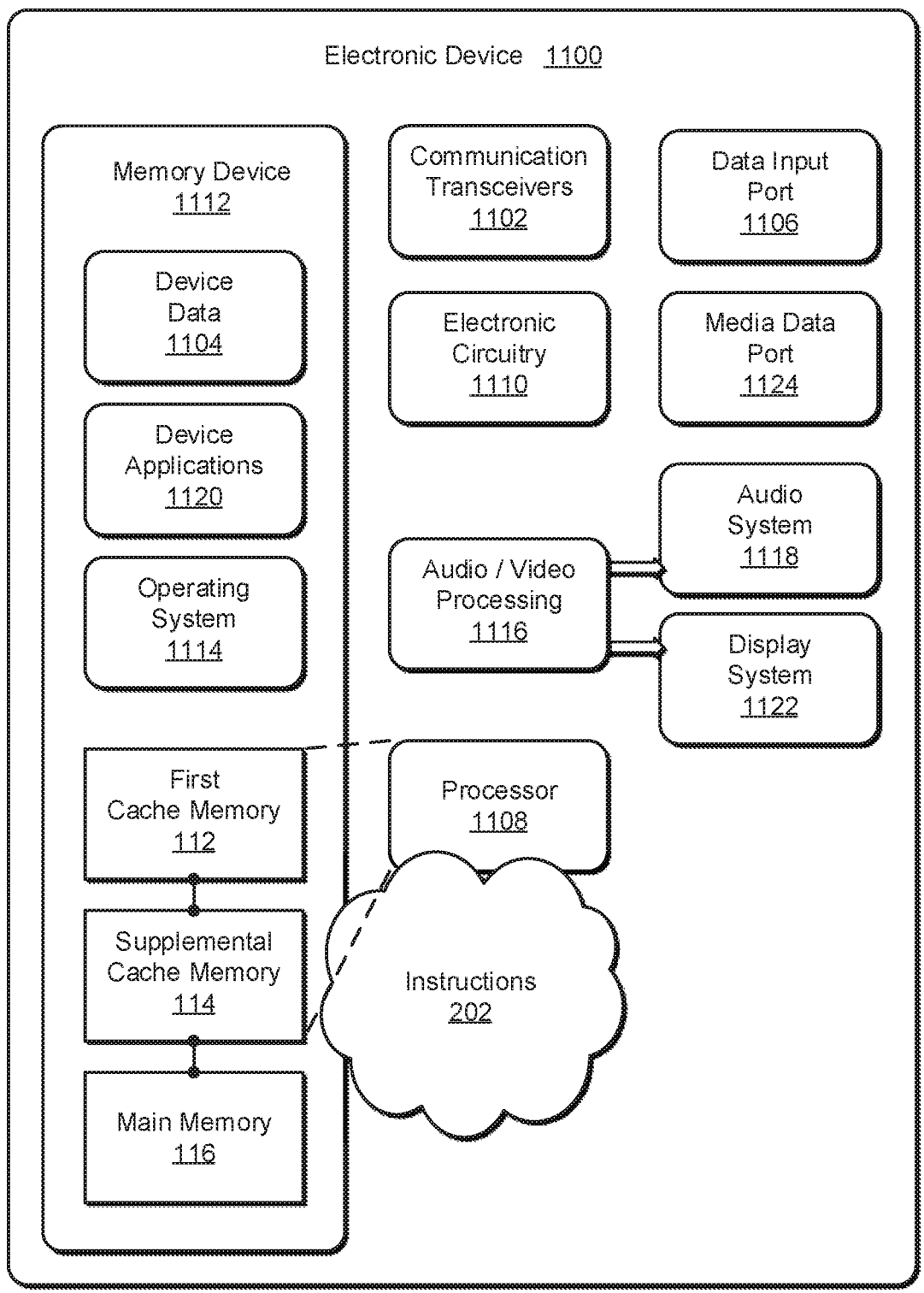
FIG. 11 illustrates various components of an example electronic device that can implement power-conserving cache memory usage in accordance with one or more implementations.

FIG. 11 illustrates various components of an example electronic device that can implement power-conserving cache memory usage in accordance with one or more implementations as described with reference to any of the previous FIGS. 1-10. The electronic device may be implemented as any one or combination of a fixed or mobile device, in any form of a consumer, computer, portable, user, server, communication, phone, navigation, gaming, audio, camera, messaging, media playback, and/or other type of electronic device 102, such as the smart phone that is depicted FIG. 1.

Electronic device 1100 can include one or more communication transceivers 1102 that enable wired and/or wireless communication of device data 1104, such as received data, transmitted data, or other information as described above. Example communication transceivers 1102 include NFC transceivers, WPAN radios compliant with various IEEE 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (WiMAX™) standards, infrared (IR) transceivers compliant with an Infrared Data Association (IrDA) protocol, and wired local area network (LAN) Ethernet transceivers.

The electronic device 1100 may also include one or more data input ports 1106 via which any type of data, media content, and/or other inputs can be received, such as user-selectable inputs, messages, applications, music, television content, recorded video content, and any other type of audio, video, and/or image data received from any content and/or data source. The data input ports 1106 may include USB ports, coaxial cable ports, fiber optic ports for optical fiber interconnects or cabling, and other serial or parallel connectors (including internal connectors) for flash memory, DVDs, CDs, and the like. These data input ports 1106 may be used to couple the electronic device to components, peripherals, or accessories such as keyboards, microphones, or cameras.

The electronic device 1100 of this example includes at least one processor 1108 (e.g., any one or more of application processors, microprocessors, digital-signal processors (DSPs), controllers, and the like), which can include a combined processor and memory system (e.g., implemented as part of an SoC), that processes (e.g., executes) computer-executable instructions 202 to control operation of the device. The processor 1108 may be implemented as an application processor, embedded controller, microcontroller, and the like. Generally, a processor or processing system may be implemented at least partially in hardware, which can include components of an integrated circuit or on-chip system, a digital-signal processor (DSP), an application-specific integrated circuit (ASIC), a field-programmable gate array (FPGA), a complex programmable logic device (CPLD), and other implementations in silicon and/or other hardware.

Alternatively or additionally, the electronic device 1100 can be implemented with any one or combination of electronic circuitry, which may include software, hardware, firmware, or fixed logic circuitry that is implemented in connection with processing and control circuits, which are generally indicated at 1110 (as electronic circuitry 1110).

This electronic circuitry 1110 can implement executable or hardware-based modules (not shown), such as through processing/computer-executable instructions 202 stored on computer-readable media, through logic circuitry and/or hardware (e.g., such as an FPGA), and so forth.

Although not shown, the electronic device 1100 can include a system bus, interconnect, crossbar, or data transfer system that couples the various components within the device. A system bus or interconnect can include any one or combination of different bus structures, such as a memory bus or memory controller, a peripheral bus, a universal serial bus, and/or a processor or local bus that utilizes any of a variety of bus architectures.

The electronic device 1100 also includes one or more memory devices 1112 that enable data storage, examples of which include random access memory (RAM), non-volatile memory (e.g., read-only memory (ROM), flash memory, EPROM, and EEPROM), and a disk storage device. Thus, the memory device(s) 1112 can be distributed across different logical storage levels of a system as well as at different physical components. The memory device(s) 1112 provide data storage mechanisms to store the device data 1104, other types of code and/or data, and various device applications 1120 (e.g., software applications or programs). For example, an operating system 1114 can be maintained as software instructions within the memory device 1112 and executed by the processor 1108.

In some implementations, the electronic device 1100 also includes an audio and/or video processing system 1116 that processes audio data and/or passes through the audio and video data to an audio system 1118 and/or to a display system 1122 (e.g., a video buffer or a screen of a smart phone or camera). The audio system 1118 and/or the display system 1122 may include any devices that process, displays, and/or otherwise renders audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1124. In some implementations, the audio system 1118 and/or the display system 1122 are external or separate components of the electronic device 1100. Alternatively, the display system 1122 can be an integrated component of the example electronic device 1100, such as part of an integrated touch interface.

The electronic device 1100 of FIG. 11 is an example implementation of the electronic device 102 of FIG. 1. Thus, the processor 1108 is an example of the processor 106 (e.g., of FIGS. 1 and 4), and the operating system 1114 is an example of the operating system 210 (e.g., of FIGS. 2 and 5). The power management module 212 or the code analysis module 214 (both of FIG. 2) may therefore be realized using the electronic device 1100. In FIG. 11, the first cache memory 112, the supplemental cache memory 114, and the main memory 116 are depicted as forming at least a portion of a memory system, such as by being part of one or more memory devices 1112. As described above, one or more of these memory components may be part of a same integrated circuit as that of the processor 1108 (e.g., the first cache memory 112 and the supplemental cache memory 114 may be implemented with the processor 1108 as part of an SoC, as indicated by the dashed lines) or instead located on a separate die, or even disposed on a different printed circuit board. Although not explicitly illustrated, the electronic device 1100 may also include control circuitry 108, and thus the power manager 216 or the memory manager 218 (e.g., of FIGS. 2 and 4). Thus, the principles of power-conserving cache memory usage as described herein can be implemented by, or in conjunction with, the electronic device 1100 of FIG. 11.

Although implementations of power-conserving cache memory usage have been described in language specific to certain features and/or methods, the subject of the appended claims is not necessarily limited to the specific features or methods described. Rather, the specific features and methods are disclosed as example implementations for power-conserving cache memory usage.

What is claimed is:

1. An electronic device comprising:
   a first cache memory at a first hierarchical level;
   a supplemental cache memory at a second hierarchical level, the supplemental cache memory communicatively coupled to the first cache memory and configured to attempt to handle cache misses of the first cache memory, the second hierarchical level lower than the first hierarchical level, the supplemental cache memory comprising at least one computer-readable storage medium that is physically separate from the first cache memory, the supplemental cache memory smaller and configured to store less information than the first cache memory;
   a main memory at a third hierarchical level, the main memory communicatively coupled to the first cache memory and the supplemental cache memory, the third hierarchical level lower than the second hierarchical level; and
   control circuitry coupled to the supplemental cache memory and the main memory, the control circuitry configured to cause a transition between two or more functional memory states, the two or more functional memory states including:
      a first functional memory state in which the supplemental cache memory is in an inactive operational mode and the main memory is in a regular power mode; and
      a second functional memory state in which the supplemental cache memory is in an active operational mode and the main memory is in a low-power mode.

2. The electronic device of claim 1, wherein:
   the inactive operational mode corresponds to the supplemental cache memory being bypassed for memory requests that miss in the first cache memory;
   the active operational mode corresponds to the supplemental cache memory storing information to handle the memory requests that miss in the first cache memory;
   the regular power mode corresponds to information in the main memory being preserved and accessible to handle the memory requests that miss in the first cache memory; and
   the low-power mode corresponds to information in the main memory being preserved but inaccessible until the main memory is awakened.

3. The electronic device of claim 1, wherein the two or more functional memory states further include a third functional memory state in which the supplemental cache memory is in a monitor operational mode and the main memory is in the regular power mode, and the supplemental cache memory is configured to cache information for the first cache memory in the monitor operational mode to prepare for a transition from the first functional memory state to the second functional memory state.

4. The electronic device of claim 3, wherein the two or more functional memory states further include a fourth functional memory state in which the supplemental cache memory is in a scrub operational mode and the main memory is in the regular power mode, and the supplemental cache memory is configured to write back dirty information to the main memory in the scrub operational mode in preparation for a transition from the second functional memory state to the first functional memory state via the fourth functional memory state.

5. The electronic device of claim 1, wherein the supplemental cache memory is configured to attempt to handle at least one of cache overflows or the cache misses of the first cache memory responsive to the supplemental cache memory being in the active operational mode of the second functional memory state.

6. The electronic device of claim 1, wherein the first cache memory comprises an N-way set associative cache memory with "N" representing a positive integer, and the supplemental cache memory comprises an associative cache memory that is at least one of fully associative or M-way set associative with "M" representing another positive integer that is greater than the positive integer of "N."

7. The electronic device of claim 1, wherein:
the supplemental cache memory is configured to be available to operate as a lower-level cache memory resource for the first cache memory in the second functional memory state and to be present but unavailable to operate as a lower-level cache memory resource for the first cache memory in the first functional memory state; and
the electronic device comprises an integrated circuit chip, the integrated circuit chip including:
the at least one computer-readable storage medium of the supplemental cache memory; and
another at least one computer-readable storage medium of the first cache memory.

8. The electronic device of claim 1, further comprising:
a register that is configured to be accessible by software, the register configured to hold a settable value to enable the second functional memory state.

9. The electronic device of claim 1, wherein the control circuitry is configured to initiate a transition between the two or more functional memory states based on an impact of activity of the main memory.

10. The electronic device of claim 9, wherein the control circuitry is configured to estimate the impact of activity of the main memory by at least one of tracking cache misses or monitoring utilization of an interconnect that is coupled to the main memory.

11. A method comprising:
operating a memory system that includes a first cache memory, a supplemental cache memory, and a main memory; the supplemental cache memory comprising at least one computer-readable storage medium that is physically separate from the first cache memory, the supplemental cache memory smaller and configured to store less information than the first cache memory, the supplemental cache memory configured to selectively handle cache misses or cache overflows of the first cache memory;
determining an operational mode of the supplemental cache memory, the operational mode comprising an inactive operational mode or an active operational mode;
responsive to the supplemental cache memory being in the inactive operational mode and the main memory being in a regular power mode,
bypassing the supplemental cache memory for a memory request associated with a cache miss or a cache overflow of the first cache memory; and
routing the memory request to the main memory; and
responsive to the supplemental cache memory being in the active operational mode and the main memory being in a low-power mode,
determining that information targeted by the memory request is stored in the supplemental cache memory; and
responsive to determining that the targeted information is stored in the supplemental cache memory, providing, from the supplemental cache memory, the targeted information.

12. The method of claim 11, further comprising:
determining that the targeted information is not stored in the supplemental cache memory; and
responsive to determining that the targeted information is not stored in the supplemental cache memory,
awakening the main memory from the low-power mode; and
providing from the main memory the targeted information.

13. The method of claim 11, further comprising:
operating the memory system in a functional memory state of multiple functional memory states, the multiple functional memory states including:
a first functional memory state in which the supplemental cache memory is in the inactive operational mode and the main memory is in-a the regular power mode; and
a second functional memory state in which the supplemental cache memory is in the active operational mode and the main memory is in-a the low- power mode;
estimating an impact of activity of the main memory; and
transitioning between two or more of the multiple functional memory states based on the estimated impact of activity of the main memory.

14. The method of claim 13, wherein the estimating comprises at least one of:
tracking cache misses or cache overflows of the first cache memory or the supplemental cache memory;
monitoring memory requests that are routed to the main memory; or analyzing execution properties of code.

15. The method of claim 13, wherein:
responsive to the estimated impact of activity of the main memory exceeding a threshold amount, the transitioning comprises transitioning from the second functional memory state to the first functional memory state, the transitioning including:
writing back dirty information from the supplemental cache memory to the main memory; and
powering down the supplemental cache memory.

16. The method of claim 13, wherein:
the operating the memory system in a functional memory state comprises operating the memory system in a third functional memory state in which the supplemental cache memory is powered up and the main memory is in the regular power mode, including loading data into the supplemental cache memory responsive to memory requests; and
responsive to the estimated impact of activity of the main memory being below a threshold amount while operating the memory system in the third functional memory state, the transitioning comprises transitioning from the third functional memory state to the second functional memory state, the transitioning including: placing the main memory in the low-power mode.

17. The method of claim 13, further comprising:
responsive to the memory system being operated in the second functional memory state, routing a direct memory access (DMA) request to at least one of the first cache memory or the supplemental cache memory.

18. An electronic device comprising:
one or more processors; and
one or more computer-readable storage media including:
　a first cache memory at a first hierarchical level;
　a main memory at a third hierarchical level;
　a supplemental cache memory at a second hierarchical level, the supplemental cache memory communicatively coupled between the first cache memory and the main memory, the supplemental cache memory comprising at least one computer-readable storage medium that is physically separate from the first cache memory, the supplemental cache memory smaller and configured to store less information than the first cache memory, the second hierarchical level lower than the first hierarchical level, the third hierarchical level lower than the second hierarchical level;
　a register configured to hold a settable value; and
　instructions stored on the one or more computer-readable storage media that, responsive to execution by the one or more processors, cause to be performed operations comprising:
　　causing code to execute on the one or more processors; and
　　adjusting the settable value based on the code to selectively enable the supplemental cache memory to operate as a lower-level cache resource with respect to the first cache memory, including:
　　　enabling the supplemental cache memory to operate as the lower-level cache resource based on the supplemental cache memory being in an active operational mode and the main memory being in a low-power mode; and
　　　disabling the supplemental cache memory from operating as the lower-level cache resource based on the supplemental cache memory being in an inactive operational mode and the main memory being in a regular power mode.

19. The electronic device of claim 18, wherein the adjusting comprises at least one of:
　establishing the settable value to permit hardware to selectively activate the supplemental cache memory; or
　establishing the settable value to instruct the hardware to place the supplemental cache memory in a monitor operational mode to activate the supplemental cache memory and attempt to place the main memory in a low-power mode.

20. The electronic device of claim 18, wherein the instructions, responsive to execution by the one or more processors, cause to be performed operations further comprising:
　analyzing the code, including at least one of:
　　determining a size of the code; or
　　observing a memory usage pattern of the code during execution,
　wherein the adjusting of the settable value is based on the analyzing of the code.

* * * * *

UNITED STATES PATENT AND TRADEMARK OFFICE
CERTIFICATE OF CORRECTION

PATENT NO. : 10,705,590 B2  Page 1 of 1
APPLICATION NO. : 15/824744
DATED : July 7, 2020
INVENTOR(S) : Christopher J. Phoenix It is certified that error appears in the above-identified patent and that said Letters Patent is hereby corrected as shown below:

In the Claims

Column 24, Line 33, after "is" before "the" delete "in-a" insert --in--

Column 24, Line 37, after "is" before "the" delete "in-a" insert --in--

Column 24, Lines 37 and 38, after "the" before "mode;" delete "low- power" insert --low-power--

Signed and Sealed this
Eighteenth Day of August, 2020

Andrei Iancu
*Director of the United States Patent and Trademark Office*